(12) United States Patent
Hashimoto et al.

(10) Patent No.: US 11,128,891 B2
(45) Date of Patent: Sep. 21, 2021

(54) IMAGE DECODING APPARATUS AND IMAGE CODING APPARATUS

(71) Applicant: Sharp Kabushiki Kaisha, Sakai (JP)

(72) Inventors: Tomonori Hashimoto, Sakai (JP); Tomohiro Ikai, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/087,654

(22) Filed: Nov. 3, 2020

(65) Prior Publication Data

US 2021/0136415 A1 May 6, 2021

(30) Foreign Application Priority Data

Nov. 6, 2019 (JP) .............................. JP2019-201150

(51) Int. Cl.
*H04N 11/02* (2006.01)
*H04N 19/60* (2014.01)
*H04N 19/176* (2014.01)
*H04N 19/186* (2014.01)

(52) U.S. Cl.
CPC ........... *H04N 19/60* (2014.11); *H04N 19/176* (2014.11); *H04N 19/186* (2014.11)

(58) Field of Classification Search
CPC ..................................................... H04N 19/60
USPC ....................................... 375/240.01–240.29
See application file for complete search history.

(56) References Cited

U.S. PATENT DOCUMENTS

| 2005/0213851 | A1* | 9/2005 | Lin | G06T 3/4084 382/298 |
| 2007/0189626 | A1* | 8/2007 | Tanizawa | H04N 19/70 382/251 |
| 2008/0107176 | A1* | 5/2008 | Chatterjee | H04N 19/107 375/240.14 |
| 2010/0226429 | A1* | 9/2010 | Lee | H04N 19/176 375/240.03 |
| 2014/0086311 | A1* | 3/2014 | Lou | H04N 19/157 375/240.03 |
| 2015/0043637 | A1* | 2/2015 | Morigami | H04N 19/51 375/240.12 |

(Continued)

OTHER PUBLICATIONS

Zhao et al., "Non-CE6: Harmonization of LFNST, MIP and implicit MTS", Joint Video Experts Team (JVET) of ITU-T SG 16 WP 3 and ISO/IEC JTC 1/SC 29/WG 11, JVET-O0540, Jul. 3-12, 2019, pp. 1-4.

(Continued)

*Primary Examiner* — Leron Beck
(74) *Attorney, Agent, or Firm* — Keating & Bennett, LLP

(57) ABSTRACT

An image decoding apparatus decodes a transform coefficient on a transform unit basis, decodes a flag scaling_matrix_for_lfnst_disabled_flag indicating whether to apply a quantization matrix during a non-separable transform, scales the transform coefficient by utilizing a scaling list, and performs a non-separable transform in accordance with a non-separable transform index lfnst_idx. In a case that scaling_matrix_for_lfnst_disabled_flag==1 and lfnst_idx != 0 and a size of a transform block is equal to or greater than a prescribed size, instead of scaling using the quantization matrix according to a position of the transform coefficient, uniform quantization not depending on the position of the transform coefficient is performed.

4 Claims, 18 Drawing Sheets

(56) References Cited

U.S. PATENT DOCUMENTS

| | | | | |
|---|---|---|---|---|
| 2015/0063446 | A1* | 3/2015 | Sugio | H04N 19/18 |
| | | | | 375/240.03 |
| 2017/0094313 | A1* | 3/2017 | Zhao | H04N 19/12 |
| 2017/0324643 | A1* | 11/2017 | Seregin | H04N 19/16 |
| 2018/0324417 | A1* | 11/2018 | Karczewicz | H04N 19/105 |
| 2019/0007705 | A1* | 1/2019 | Zhao | H04N 19/60 |
| 2020/0304794 | A1* | 9/2020 | Lai | H04N 19/30 |

OTHER PUBLICATIONS

Ramasubramonian et al., "AHG15: Scaling matrices for LFNST-coded blocks", Joint Video Experts Team (JVET) of ITU-T SG 16 WP 3 and ISO/IEC JTC 1/SC 29/WG 11, JVET-P0365-v2, Oct. 1-11, 2019, pp. 1-4.

Chubach et al., "CE7-related: Support of signalling default and user-defined scaling matrices", Joint Video Experts Team (JVET) of ITU-T SG 16 WP 3 and ISO/IEC JTC 1/SC 29/WG 11, JVET-N0090-v2, Mar. 19-27, 2019, pp. 1-5.

Koo et al., "CE6: Reduced Secondary Transform (RST) (CE6-3.1)", Joint Video Experts Team (JVET) of ITU-T SG 16 WP 3 and ISO/IEC JTC 1/SC 29/WG 11, JVET-N0193, Mar. 19-27, 2019, pp. 1-19.

\* cited by examiner

| max( nTbW, nTbH ) | | 2 | 4 | 8 | 16 | 32 | 64 |
|---|---|---|---|---|---|---|---|
| predMode = MODE_INTRA | cIdx = 0 (Y) | | 2 | 8 | 14 | 20 | 26 |
| | cIdx = 1 (Cb) | | 3 | 9 | 15 | 21 | 21 |
| | cIdx = 2 (Cr) | | 4 | 10 | 16 | 22 | 22 |
| predMode = MODE_INTER (INTER, IBC) | cIdx = 0 (Y) | | 5 | 11 | 17 | 23 | 27 |
| | cIdx = 1 (Cb) | 0 | 6 | 12 | 18 | 24 | 24 |
| | cIdx = 2 (Cr) | 1 | 7 | 13 | 19 | 25 | 25 |

FIG. 11

| 16 | 16 | 16 | 16 | 17 | 18 | 21 | 24 |
|----|----|----|----|----|----|----|-----|
| 16 | 16 | 16 | 16 | 17 | 19 | 22 | 25 |
| 16 | 16 | 17 | 18 | 20 | 22 | 25 | 29 |
| 16 | 16 | 18 | 21 | 24 | 27 | 31 | 36 |
| 17 | 17 | 20 | 24 | 30 | 35 | 41 | 47 |
| 18 | 19 | 22 | 27 | 35 | 44 | 54 | 65 |
| 21 | 22 | 25 | 31 | 41 | 54 | 70 | 88 |
| 24 | 25 | 29 | 36 | 47 | 65 | 88 | 115 |

FIG. 14

(a)
| adaptation_parameter_set_rbsp( ) { | Descriptor |
|---|---|
|   adaptation_parameter_set_id | u(5) ← SYN1001 |
|   aps_params_type | u(3) ← SYN1002 |
|   if( aps_params_type == ALF_APS ) | |
|     alf_data( ) | |
|   else if( aps_params_type == LMCS_APS ) | |
|     lmcs_data( ) | |
|   else if( aps_params_type == SCALING_APS ) | |
|     scaling_list_data( ) | ← SYN1003 |
|   ... | |
| } | |

(b)
| scaling_list_data( ) { | Descriptor |
|---|---|
|   scaling_matrix_for_lfnst_disabled_flag | u(1) |
|   for( id = 0; id < 28; id++ ) { | |
|     matrixSize = (id < 2) ? 2 : ((id < 8) ? 4 : 8) | |
|     scaling_list_copy_mode_flag[ id ] | u(1) |
|     if( !scaling_list_copy_mode_flag[ id ] ) | |
|       scaling_list_pred_mode_flag[ id ] | u(1) |
|     if( ( scaling_list_copy_mode_flag[ id ] \|\| scaling_list_pred_mode_flag[ id ] ) | |
|       && id != 0 && id != 2 && id != 8 ) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coef[ id – 14 ] | se(v) |
|         nextCoef += scaling_list_dc_coef[ id – 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef[ id ][ i ] | se(v) |
|           nextCoef += scaling_list_delta_coef[ id ][ i ] | |
|         } | |
|         ScalingList[ id ][ i ] = nextCoef | |
|       } | |
|     } | |
|   } | |
| } | |

FIG. 15

IMAGE DECODING APPARATUS AND IMAGE CODING APPARATUS

CROSS-REFERENCE TO RELATED APPLICATIONS

This application claims the benefit of priority to Japanese Patent Application Number 2019-201150 filed on Nov. 6, 2019. The entire contents of the above-identified application are hereby incorporated by reference.

BACKGROUND

Technical Field

Embodiments of the present disclosure relate to an image decoding apparatus and an image coding apparatus.

An image coding apparatus and an image decoding apparatus are used to efficiently transmit or record images; the image coding apparatus generates coded data by coding an image, and the image decoding apparatus generates a decoded image by decoding the coded data.

Specific image coding schemes include, for example, H.264/AVC, High-Efficiency Video Coding (HEVC) schemes, and the like.

In such a video coding scheme, images (pictures) constituting a video are managed by a hierarchical structure including slices obtained by splitting an image, Coding Tree Units (CTUs) obtained by splitting a slice, units of coding (which may be referred to as Coding Units (CUs)) obtained by splitting a coding tree unit, and Transform Units (TUs) obtained by splitting a coding unit, and the images are coded/decoded on a CU-by-CU basis.

In such an image coding scheme, typically, a prediction image is generated based on a local decoded image obtained by coding/decoding an input image, and the prediction image is subtracted from the input image to obtain a prediction error (which may be referred to also as a "difference image" or "residual image"), which is then coded. Methods of generating prediction images include an inter-picture prediction (an inter prediction) and an intra-picture prediction (intra prediction).

The recent image coding and decoding techniques include "CE6: Reduced Secondary Transform (RST) (CE6-3.1)," JVET-N0193-v5, Joint Video Experts Team (JVET) of ITU-T SG 16 WP 3 and ISO/IEC JTC 1/SC 29/WG 11, Mar. 27, 2019.

"CE6: Reduced Secondary Transform (RST) (CE6-3.1)," JVET-N0193-v5, Joint Video Experts Team (JVET) of ITU-T SG 16 WP 3 and ISO/IEC JTC 1/SC 29/WG 11, Mar. 27, 2019 discloses an image coding apparatus performing, for each transform unit, a Reduced Secondary Transform (RST), that is, non-separable transform, on a coefficient resulting from a transform of the prediction error to derive a transform coefficient.

"CE6: Reduced Secondary Transform (RST) (CE6-3.1)," JVET-N0193-v5, Joint Video Experts Team (JVET) of ITU-T SG 16 WP 3 and ISO/IEC JTC 1/SC 29/WG 11, Mar. 27, 2019 discloses an image decoding apparatus that inversely transforms a transform coefficient for each transform unit by an inverse non-separable transform. "CE7-related: Support of signalling default and user-defined scaling matrices," JVET-N0090-v3, Joint Video Experts Team (JVET) of ITU-T SG 16 WP 3 and ISO/IEC JTC 1/SC 29/WG 11, Mar. 23, 2019 discloses a technique that uses a quantization matrix (scaling list) to perform different scaling depending on the position of the transform coefficient.

"AHG15: Scaling matrices for LFNST-coded blocks," JVET-P0365-v2, Joint Video Experts Team (JVET) of ITU-T SG 16 WP 3 and ISO/IEC JTC 1/SC 29/WG 11, Oct. 11, 2019 discloses conditions for refraining from scaling. "Non-CE6: Harmonization of LFNST, MIP and implicit MTS," JVET-O0540, Joint Video Experts Team (JVET) of ITU-T SG 16 WP 3 and ISO/IEC JTC 1/SC 29/WG 11, Jun. 26, 2019 discloses conditions for performing implicit multiple transform selection.

SUMMARY

In "AHG15: Scaling matrices for LFNST-coded blocks," JVET-P0365-v2, Joint Video Experts Team (JVET) of ITU-T SG 16 WP 3 and ISO/IEC JTC 1/SC 29/WG 11, Oct. 11, 2019, there is a problem in that scaling is refrained from even in a case that non-separable transform is not applied.

In "Non-CE6: Harmonization of LFNST, MIP and implicit MTS," JVET-O0540, Joint Video Experts Team (JVET) of ITU-T SG 16 WP 3 and ISO/IEC JTC 1/SC 29/WG 11, Jun. 26, 2019, there is a problem in that the implicit multiple transform selection is refrained from even in a case that the non-separable transform is not applied.

To solve the above-described problem, an image decoding apparatus is provided that includes a scaling list decoder configured to decode a transform coefficient on every transform unit and to decode a flag scaling_matrix_for_lfnst_disabled_flag indicating whether to apply a quantization matrix in a case of a non-separable transform, a scaling unit configured to scale the transform coefficient by utilizing a scaling list, and an inverse transform processing unit configured to perform a non-separable transform in accordance with a non-separable transform index lfnst_idx, wherein, in a case that scaling_matrix_for_lfnst_disabled_flag==1 and lfnst_idx !=0 and a size of a transform block is equal to or greater than a prescribed size, the scaling unit performs, instead of scaling using the quantization matrix according to a position of the transform coefficient, uniform quantization not depending on the position of the transform coefficient.

An image decoding apparatus is provided that includes a scaling unit configured to decode a transform coefficient on a transform unit basis and to scale the transform coefficient decoded, a second transform processing unit configured to perform a non-separable transform in accordance with a non-separable transform index lfnst_idx, and a first transform processing unit configured to apply a core transform to a transform coefficient resulting from transforming performed by the scaling unit or the second transform processing unit, wherein in a case that lfnst_idx==0 or a size of a transform block is equal to or greater than a prescribed size, the first transform processing unit implicitly selects one transform matrix from multiple transform matrices and transforms the transform matrix selected.

According to the configuration described above, any of the above-described problems can be solved.

BRIEF DESCRIPTION OF DRAWINGS

The disclosure will be described with reference to the accompanying drawings, wherein like numbers reference like elements.

FIG. 11 is a diagram illustrating a correspondence among PredMode, cIdx, max (nTbW, nTbH) and a matrix identifier id.

FIG. 14 is a diagram illustrating an example of a scaling list.

FIG. 15 is a diagram illustrating a syntax configuration of the scaling list.

DESCRIPTION OF EMBODIMENTS

First Embodiment

Hereinafter, embodiments of the present disclosure will be described with reference to the drawings.

Figure 1:
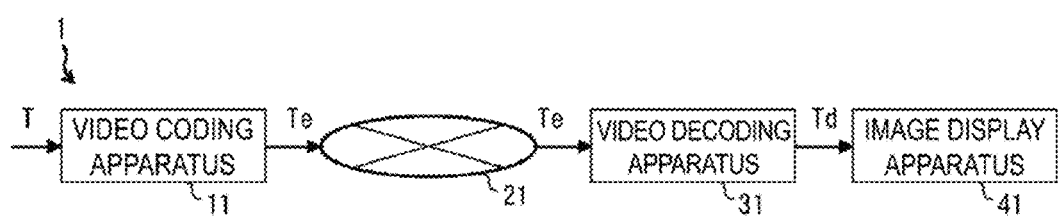
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system transmitting a coding stream obtained by coding an image to be coded, decoding the transmitted coding stream, and displaying an image. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a small network (Local Area Network (LAN)), or a combination thereof. The network 21 is not necessarily limited to a bidirectional communication network, and may be a unidirectional communication network configured to transmit broadcast waves, such as digital terrestrial television broadcasting or satellite broadcasting. The network 21 may be substituted by a storage medium in which the coding stream Te is recorded, such as a Digital Versatile Disc (DVD: registered trademark) or a Blue-ray Disc (BD: registered trademark).

The video decoding apparatus 31 decodes each of the coding streams Te transmitted from the network 21 and generates one or multiple decoded images Td.

The image display apparatus 41 displays all or part of the one or multiple decoded images Td generated by the video decoding apparatus 31. For example, the image display apparatus 41 includes a display device such as a liquid crystal display and an organic Electro-luminescence (EL) display. The display may be in a stationary form, a mobile form, an HMD form, or the like. In a case that the video decoding apparatus 31 has a high processing capability, the display displays images having high image quality, and in a case that the video decoding apparatus has only a lower processing capability, the display displays images not requiring a high processing capability or display capability.

Operator

Operators used in the present specification will be described below.

$>>$ is a right bit shift, $<<$ is a left bit shift, & is a bitwise AND, | is a bitwise OR, |= is an OR assignment operator, and || is a logical sum.

x?y:z is a ternary operator to take y in a case that x is true (other than 0) and take z in a case that x is false (0).

Clip3 (a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns an integer value of a.

floor (a) is a function that returns a minimum integer of a or less.

ceil (a) is a function that returns a maximum integer equal to or greater than a.

a/d represents the division of a by d (decimals are omitted).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
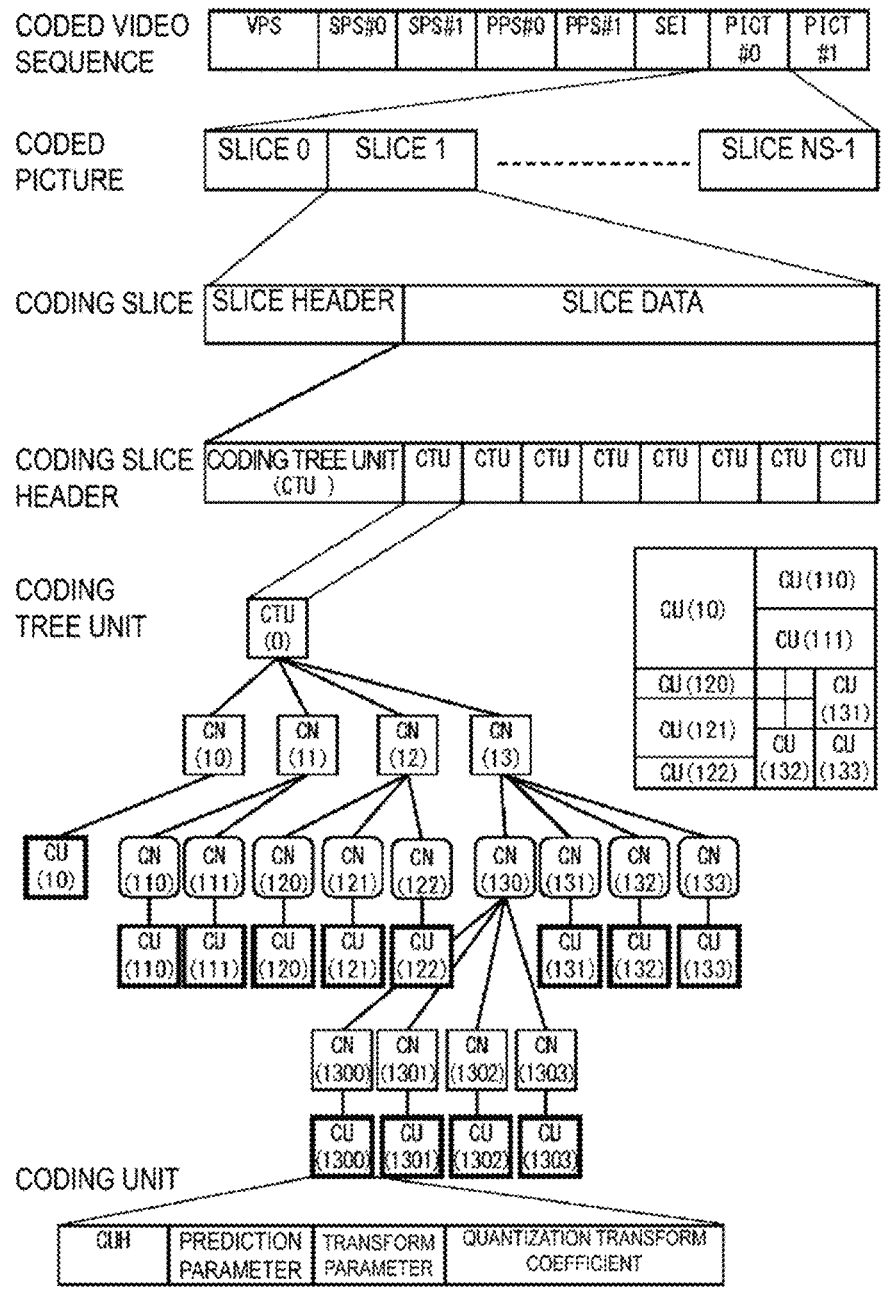
FIG. 4 is a diagram illustrating a hierarchical structure of data of a coding stream according to the present embodiment.

FIG. 4 is a diagram illustrating a hierarchical structure of data of the coding stream Te. The coding stream Te includes a sequence and multiple pictures constituting the sequence illustratively. FIG. 4 illustrates a coded video sequence defining a sequence SEQ, a coded picture prescribing a picture PICT, a coding slice prescribing a slice S, a coding slice data prescribing slice data, a coded tree unit included in the coding slice data, and a coding unit included in each coded tree unit, respectively.

Coded Video Sequence

In the coded video sequence, a set of data referenced by the video decoding apparatus 31 to decode the sequence SEQ to be processed is defined. As illustrated in the coded video sequence of FIG. 4, the sequence SEQ includes a Video Parameter Set, a Sequence Parameter Set SPS, a Picture Parameter Set PPS, a picture PICT, and Supplemental Enhancement Information SEI.

For the video parameter set VPS, in a video including multiple layers, a set of coding parameters common to multiple images and a set of coding parameters associated with the multiple layers and an individual layer included in the image are defined.

For the sequence parameter set SPS, a set of coding parameters referenced by the video decoding apparatus 31 to decode a target sequence is defined. For example, a width and a height of a picture are defined. Note that multiple SPSs may exist. In that case, any of multiple SPSs is selected from the PPS.

For the picture parameter set PPS, a set of coding parameters referenced by the video decoding apparatus 31 to decode each picture in a target sequence is defined. For example, a reference value (pic_init_qp_minus26) of a quantization step size used for decoding of a picture, a flag (weighted_pred_flag) indicating an application of a weighted prediction, and a scaling list (quantization matrix) are included. Note that multiple PPSs may exist. In that case, any of multiple PPSs is selected from each picture in a target sequence.

Coded Picture

For the coded picture, a set of data referenced by the video decoding apparatus 31 to decode the picture PICT to be processed is defined. As illustrated in a coded picture in FIG. 4, a picture PICT includes slices 0 to NS−1 (NS is the total number of slices included in the picture PICT).

Note that in a case that it is not necessary to distinguish each of the slices 0 to NS−1 below, subscripts of reference signs may be omitted. The same applies to other data with subscripts included in the coding stream Te which will be described below.

Coding Slice

For the coding slice, a set of data referenced by the video decoding apparatus 31 to decode the slice S to be processed is defined. The slice includes a slice header and slice data, as illustrated in the coding slice in of FIG. 4.

The slice header SH includes a coding parameter group referenced by the video decoding apparatus 31 to determine a decoding method for a target slice. Slice type specification information (slice_type) indicating a slice type is one example of a coding parameter included in the slice header SH.

Examples of slice types that can be specified by the slice type specification information include (1) I slice using only an intra prediction in coding, (2) P slice using a unidirectional prediction or an intra prediction in coding, and (3) B slice using a unidirectional prediction, a bidirectional prediction, or an intra prediction in coding, and the like. Note that the inter prediction is not limited to a uni-prediction or a bi-prediction, and a greater number of reference pictures may be used to generate a prediction image. Hereinafter, in a case that designations P and B slices refer to slices that include blocks for which an inter prediction can be used.

Note that, the slice header SH may include a reference to the picture parameter set PPS (pic_parameter_set_id) included in the coded video sequence.

Coding Slice Data

For the coding slice data, a set of data referenced by the video decoding apparatus 31 to decode the slice data to be processed is defined. The slice data includes a CTU, as illustrated in the coding slice header in FIG. 4. A CTU is a block of a fixed size (for example, 64×64) constituting a slice, and may be called a Largest Coding Unit (LCU).

Coding Tree Unit

For the coding tree unit in FIG. 4, a set of data referenced by the video decoding apparatus 31 to decode the CTU to be processed is defined. The CTU is split into coding units CU, which are basic units for coding processing, by recursive Quad Tree (QT) splitting, Binary Tree (BT) splitting or Ternary Tree (TT) splitting. The BT splitting and the TT splitting are collectively referred to as a multi-tree splitting (Multi Tree (MT) splitting). Nodes of a tree structure obtained by recursive quad tree splitting are referred to as Coding Nodes (CNs). Intermediate nodes of the quad tree, the binary tree, and the ternary tree are coding nodes, and the CTU itself is also defined as the highest coding node.

The CT includes, as CT information, a QT split flag (cu_split_flag) indicating whether or not to perform the QT splitting, an MT split flag (split_mt_flag) indicating the presence or absence of the MT splitting, an MT split direction (split_mt_dir) indicating the split direction of the MT splitting, and an MT split type (split_mt_type) indicating the split type of the MT splitting. cu_split_flag, split_mt_flag, split_mt_dir, split_mt_type are transmitted for each coding node.

Figure 5:
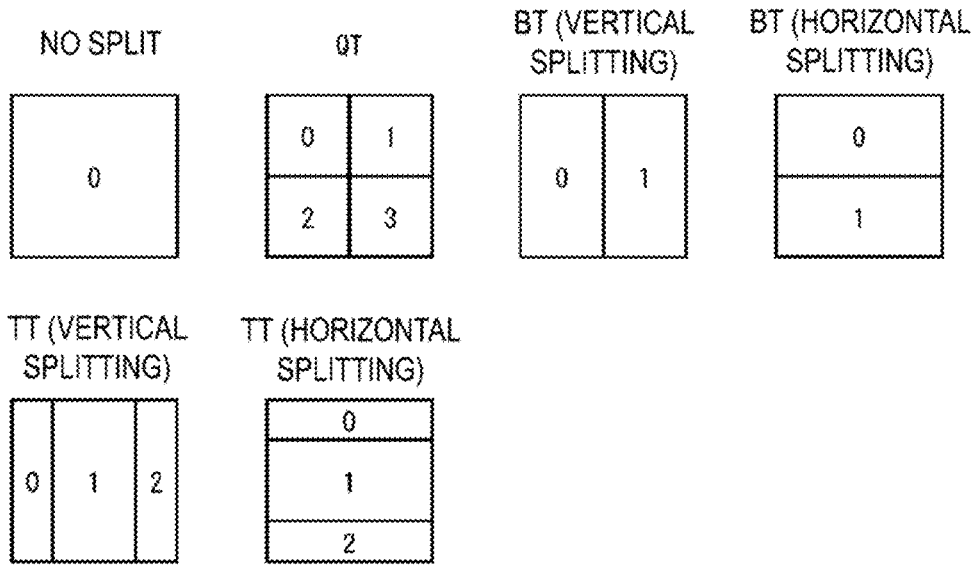
FIG. 5 is a diagram illustrating an example of splitting of a CTU.

In a case that cu_split_flag is 1, the coding node is split into four coding nodes (QT in FIG. 5).

In a case that cu_split_flag is 0, the coding node is not split and has one CU as a node in a case that split_mt_flag is 0 (no split in FIG. 5). The CU is a terminal node of the coding nodes and is not split any further. The CU is a basic unit of coding processing.

In a case that split_mt_flag is 1, the coding node is MT-split as follows. In a case that split_mt_type is 0, the coding node is horizontally split into two coding nodes (BT (horizontal splitting) in FIG. 5) in a case that split_mt_dir is 1, and in a case that split_mt_dir is 0, the coding node is vertically split into two coding nodes (BT (vertical splitting) in FIG. 5). In a case that the split_mt_type is 1, the coding node is horizontally split into three coding nodes in a case that split_mt_dir is 1 (TT (horizontal splitting) in FIG. 5), and the coding node is vertically split into three coding nodes (TT (vertical splitting) in FIG. 5) in a case that split_mt_dir is 0. This is illustrated in the CT information in FIG. 5.

For example, in a case that the size of the CTU is 64×64 pixels, the size of the CU may be any one of 64×64 pixels, 64×32 pixels, 32×64 pixels, 32×32 pixels, 64×16 pixels, 16×64 pixels, 32×16 pixels, 16×32 pixels, 16×16 pixels, 64×8 pixels, 8×64 pixels, 32×8 pixels, 8×32 pixels, 16×8 pixels, 8×16 pixels, 8×8 pixels, 64×4 pixels, 4×64 pixels, 32×4 pixels, 4×32 pixels, 16×4 pixels, 4×16 pixels, 8×4 pixels, 4×8 pixels, and 4×4 pixels.

Coding Unit

As illustrated in the coding unit in FIG. 4, a set of data referenced by the video decoding apparatus 31 to decode the coding unit to be processed is defined. Specifically, the CU includes a CU header CUH, a prediction parameter, a transform parameter, a quantization transform coefficient, and the like. For the CU header, a prediction mode and the like are defined.

Prediction processing may be performed in units of CUs or in units of sub-CUs into which the CU is further split. In a case that the CU and the sub-CU are equal in size, one sub-CU is present in the CU. In a case that the CU is greater in size than the sub-CU, the CU is split into sub-CUs. For example, in a case that the CU has a size of 8×8 and the sub-CU has a size of 4×4, the CU is split into four sub-CUs including two horizontal splits and two vertical splits.

Predictions are classified into at least two types (prediction mode CuPredMode) including an intra prediction (MODE_INTRA) and an inter prediction (MODE_INTER). A possible additional prediction mode may be an intra block copy prediction (MODE_IBC). The intra prediction and the intra block copy prediction refer to predictions within an identical picture, and the inter prediction refers to prediction processing performed between different pictures (for example, between pictures of different display points in time, and between pictures of different layer images).

Transform and quantization processing is performed in units of CUs, but a quantization transform coefficient may be entropy-coded in units of subblocks such as 4×4.
Prediction Parameter A prediction image is derived by using a prediction parameter associated with a block. The prediction parameter is classified into a prediction parameter of an intra prediction or a prediction parameter of an inter prediction.

Figure 6:
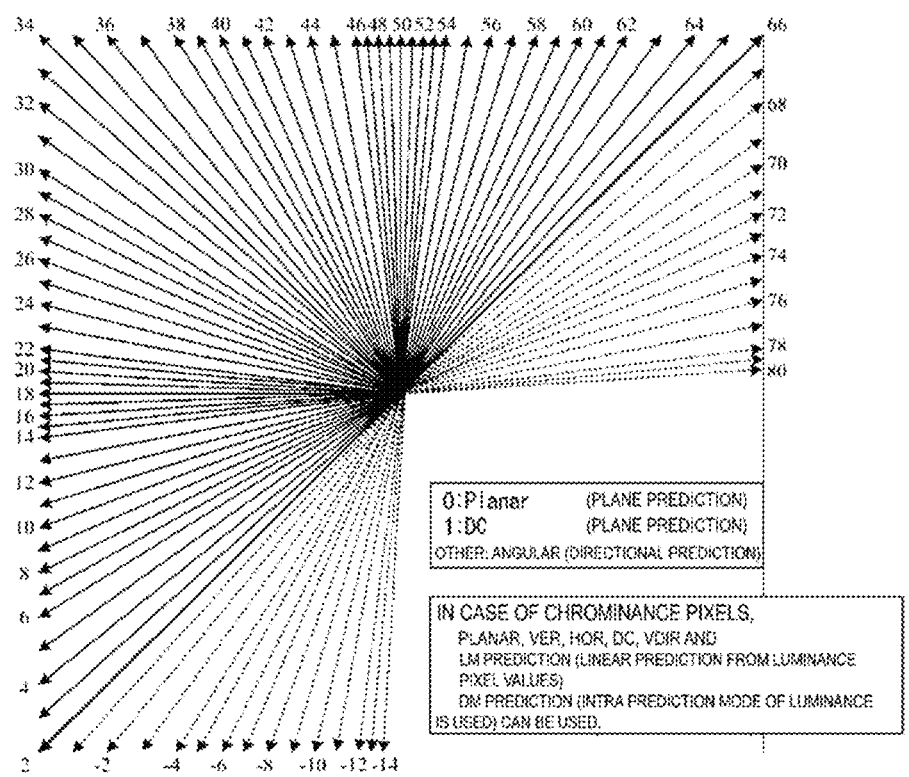
FIG. 6 is a schematic diagram indicating types (mode numbers) of an intra prediction mode.

The prediction parameter of an intra prediction will be described below. The intra prediction parameter includes a luminance prediction mode IntraPredModeY and a chrominance prediction mode IntraPredModeC. FIG. 6 is a schematic diagram indicating type (mode number) of the intra prediction mode. For example, as illustrated in FIG. 6, 67 types (0 to 66) of intra prediction modes are present. The intra prediction modes include, for example, a planar prediction (0), a DC prediction (1), and Angular predictions (2 to 66). Furthermore, LM modes (67 to 72) may be added for chrominance.

Figure 7:
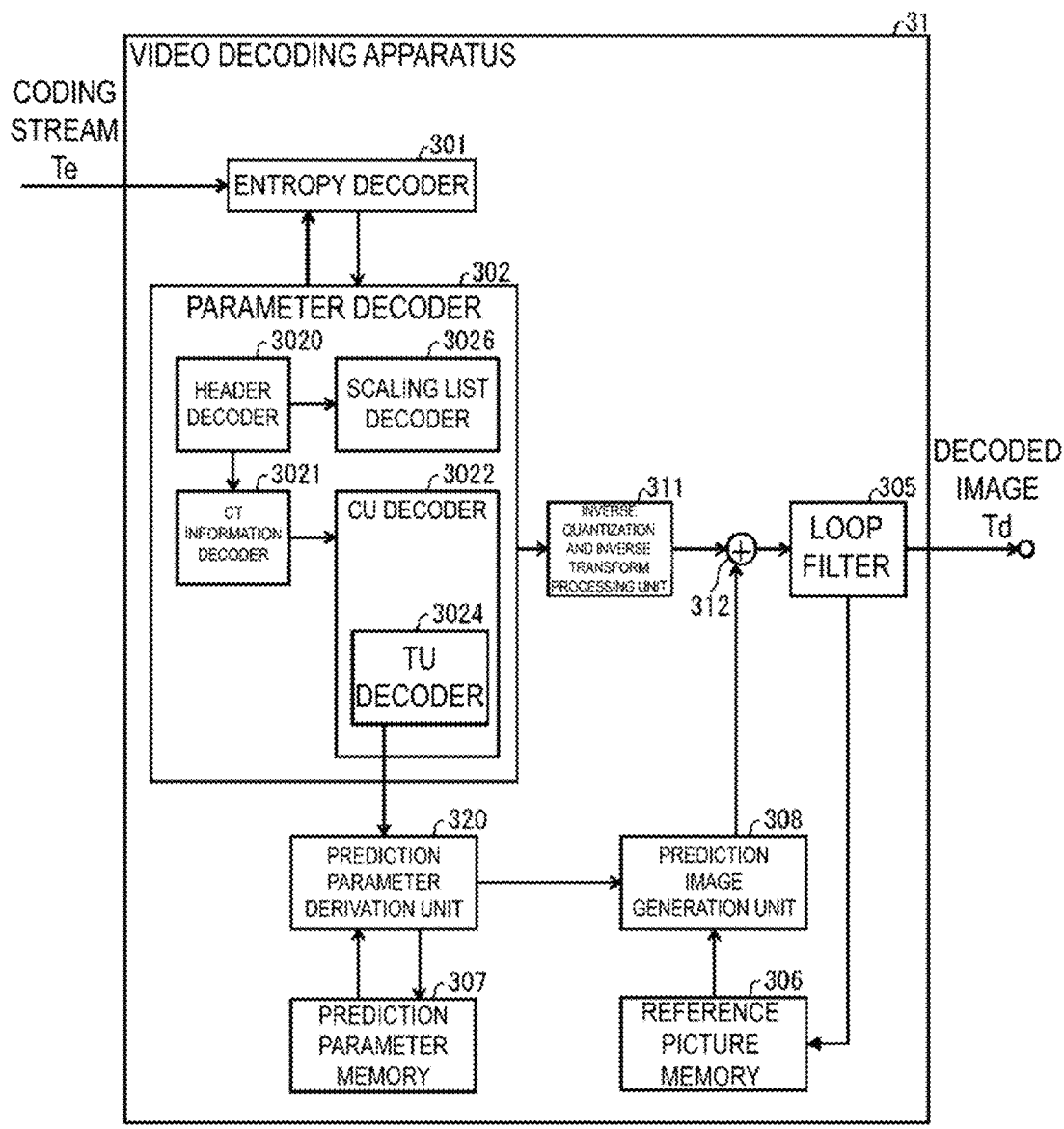
FIG. 7 is a schematic diagram illustrating a configuration of the video decoding apparatus.

Examples of syntax elements used to derive the intra prediction parameter include intra_luma_mpm_flag, intra_luma_mpm_idx, and intra_luma_mpm_remainder.
MPM intra_luma_mpm_flag is a flag indicating whether IntraPredModeY and a Most Probable Mode (MPM) of the target block match or not. The MPM is a prediction mode included in an MPM candidate list mpmCandList [ ]. The MPM candidate list is a list that stores candidates estimated to have a high probability of being applied to the target block from the intra prediction modes of neighbor blocks and a prescribed intra prediction modes. In a case that the intra_luma_mpm_flag is 1, IntraPredModeY of the target block is derived by using the MPM candidate list and the index intra_luma_mpm_idx.
IntraPredModeY=mpmCandList[intra_luma_mpm_idx]
REM In a case that intra_luma_mpm_flag is 0, the intra prediction mode is selected from the remaining modes RemIntraPredMode obtained by subtracting, from all the intra prediction modes, the intra prediction mode included in the MPM candidate list. The intra prediction mode which is selectable as RemIntraPredMode is referred to as "non-MPM" or "REM". RemIntraPredMode is derived by using the intra_luma_mpm_remainder.
Configuration of Video Decoding Apparatus Now, a configuration of the video decoding apparatus 31 (FIG. 7) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, and an addition unit 312. Note that, in some configurations, the loop filter 305 is omitted from the video decoding apparatus 31 in connection with the video coding apparatus 11 described below.

Furthermore, the parameter decoder 302 includes a header decoder 3020, a CT information decoder 3021, and a CU decoder 3022 (prediction mode decoder). The CU decoder 3022 includes a TU decoder 3024. These units may be collectively referred to as decoding modules. The header decoder 3020 decodes the parameter set information such as VPS, SPS, and PPS and the slice header (slice information) from the coded data. The CT information decoder 3021 decodes the CT from the coded data. The CU decoder 3022 decodes the CU from the coded data. In a case that the TU includes a prediction error, the TU decoder 3024 decodes QP update information (quantization correction value) and a quantization prediction error (residual_coding) from the coded data.

The CU decoder 3022 may decode intra_subpartitions_mode_flag indicating whether the mode is intra subblock splitting, Intra Subpartitioning Prediction (ISP), corresponding to a coding mode in which luminance is split into multiple subblocks for processing. In a case that intra_subpartitions_mode_flag is 0, ISP_NO_SPLIT (=0) is set for IntraSubPartitionsSplitType, and no ISP is used. In a case that intra_subpartitions_mode_flag is other than 0, intra_subpartitions_split_flag is decoded and the following setting is provided.
IntraSubPartitionsSplitType=intra_subpartitions_split_
  flag==0 ? ISP_HOR_SPLIT: ISP_VER_SPLIT
The following derivation is possible.
IntraSubPartitionsSplitType=intra_subpartitions_split_flag+1

The TU decoder 3024 decodes, from the coded data, a parameter lfnst_idx indicating the presence or absence of the non-separable transform and a transform basis. Specifically, the TU decoder 3024 decodes lfnst idx in a case that each of the width and height of the CU is equal to or greater than 4 and that the prediction mode is an intra mode. Note that lfnst_idx of 0 indicates not to perform a non-separable transform and that lfnst_idx of 1 indicates a transform using one of a set (pair) of non-separable transform bases and that lfnst_idx of 2 indicates a transform using the other non-separable transform basis.

Additionally, lfnst_idx may be 0 or 1. lfnst_idx may be derived from the intra prediction mode.
lfnst_idx=lfnst_idx !=0 ? (IntraPredModeY % 2)+1:0

The TU decoder 3024 may decode a subblock transform flag cu_sbt_flag. In a case of cu_sbt_flag being 1, the CU is split into multiple subblocks, and for only one particular subblock, the residual is decoded. Furthermore, the TU decoder 3024 may decode a flag cu_sbt_quad_flag indicating whether the number of subblocks is 4 or 2, cu_sbt_horizontal_flag indicating a split direction, and cu_sbt_pos_flag indicating a subblock including a non-zero transform coefficient.

The prediction parameter decoder 302 includes an inter prediction parameter decoder 303 and an intra prediction parameter decoder 304 not illustrated. The prediction image generation unit 308 includes an inter prediction image generation unit 309 and an intra prediction image generation unit 310.

The intra prediction image generation unit 310 may use an image adjacent to the target block to perform a DC prediction, a Planar prediction, an Angular prediction (directional prediction), an MIP prediction (Matrix-based Intra Prediction). The MIP prediction is performed in a case that intra_mip_flag is 1, and involves deriving the temporary prediction image tempPred from the product of the adjacent image and a predetermined matrix, and using the temporary prediction image tempPred directly without changing in size or enlarging the temporary prediction image tempPred to the size of the target block to derive the prediction image.

An example in which CTUs and CUs are used as units of processing will be described below, but the present disclosure is not limited to this example, and processing may be performed in units of sub-CUs. Alternatively, the CTU and the CU may be interpreted as blocks, the sub-CU may be interpreted as a subblock, and processing may be performed in units of blocks or subblocks.

The entropy decoder 301 performs entropy decoding on the coding stream Te input from the outside and separates and decodes individual codes (syntax components). Entropy coding includes a scheme in which a syntax element is variable-length-coded by using a context (probability model) adaptively selected depending on the type of the syntax element or the surrounding situation, and a scheme in which the syntax element is variable-length-coded by using a predetermined table or a calculation formula. The former CABAC (Context Adaptive Binary Arithmetic Coding) stores in memory an updated probability model for each coded or decoded picture (slice). As an initial state of the context of the P picture or the B picture, from among the probability models stored in the memory, probability models of pictures using quantization parameters with the same slice type and same slice level are set. This initial state is used for coding and decoding processing. The separated codes include prediction information used to generate a prediction image, a prediction error used to generate a difference image, and the like.

The entropy decoder 301 outputs the separated code to the parameter decoder 302. The separated code is, for example, a prediction mode CuPredMode. Which code is to be decoded is controlled based on an indication from the parameter decoder 302.

Basic Flow

Figure 8:
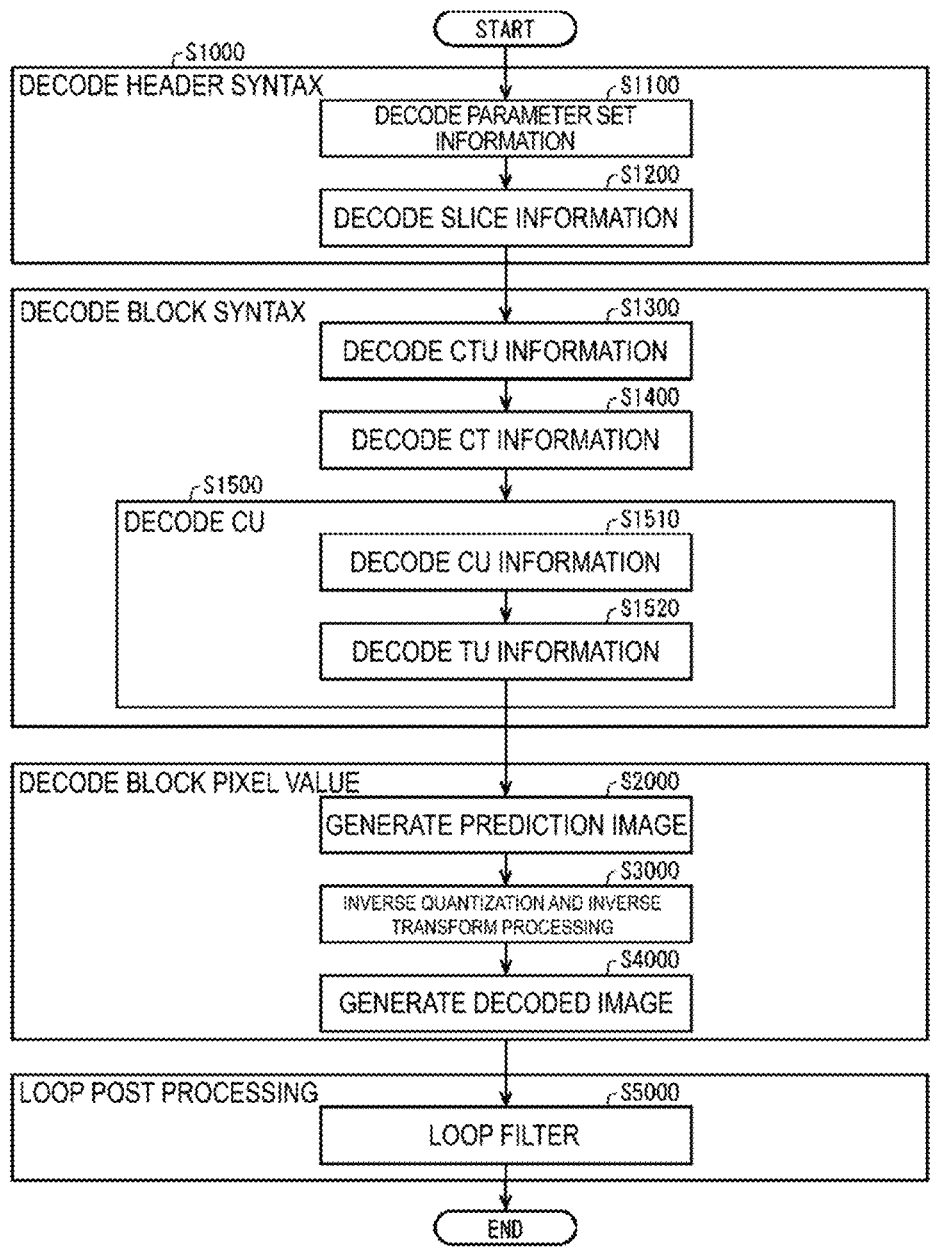
FIG. 8 is a flowchart illustrating a general operation of the video decoding apparatus.
Figure 9:
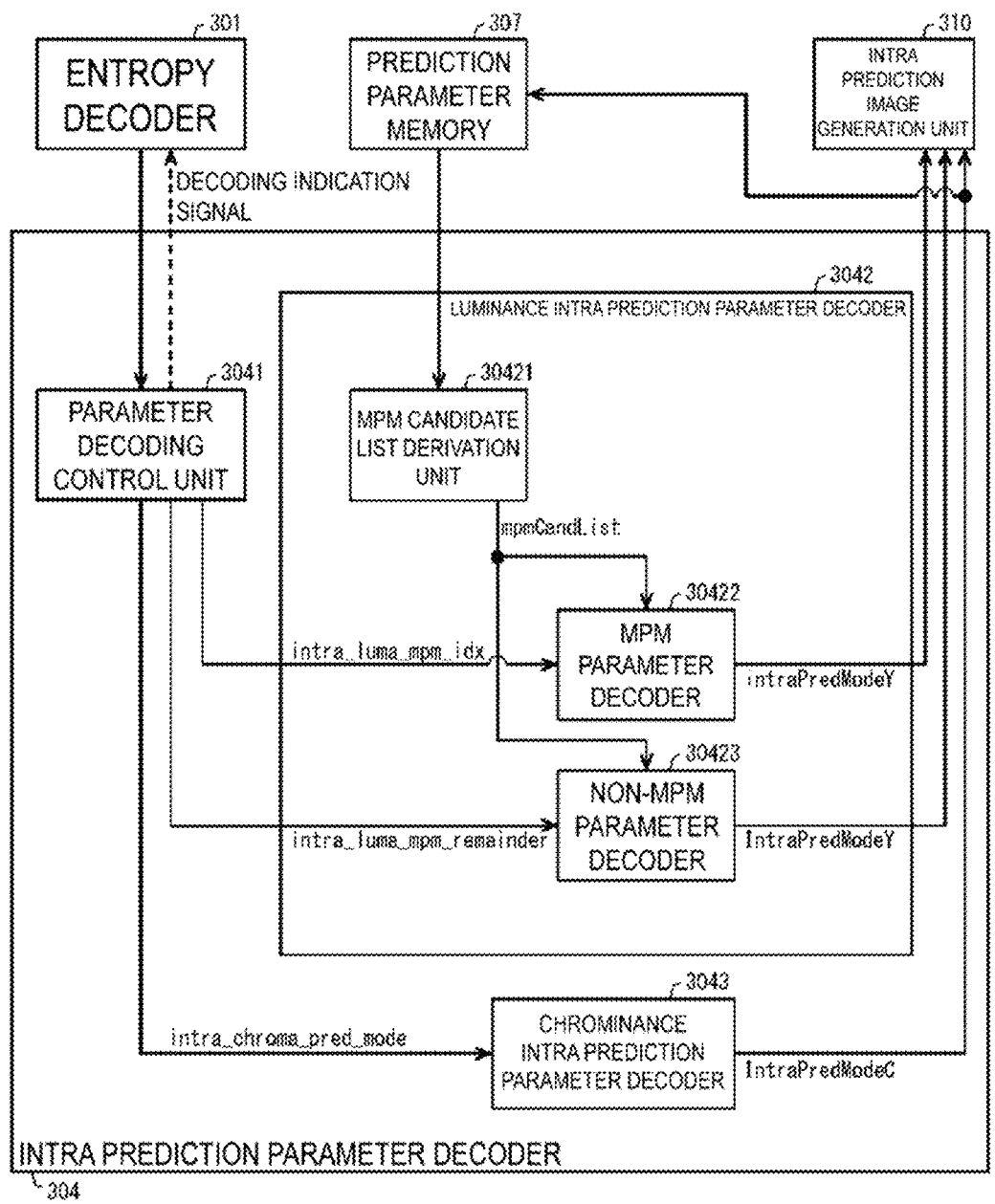
FIG. 9 is a schematic diagram illustrating a configuration of an intra prediction parameter decoder.

FIG. 8 is a flowchart illustrating general operations of the video decoding apparatus 31.

(S1100: Decode parameter set information) The header decoder 3020 decodes parameter set information such as VPS, SPS, and PPS from the coded data.

(S1200: Decode slice information) The header decoder 3020 decodes the slice header (slice information) from the coded data.

Hereinafter, the video decoding apparatus 31 derives the decoded image of each CTU by repeating the processing from S1300 to S5000 for each CTU included in the target picture.

(S1300: Decode CTU information) The CT information decoder 3021 decodes the CTU from the coded data.

(S1400: Decode CT information) The CT information decoder 3021 decodes the CT from the coded data.

(S1500: Decode CU) The CU decoder 3022 performs S1510 and S1520 to decode the CU from the coded data.

(S1510: Decode CU Information) The CU decoder 3022 decodes CU information, prediction information, a TU split flag split_transform flag, a CU residual flag cbf_cb, cbf_cr, cbf_luma, and the like from the coded data.

(S1520: Decode TU information) In a case that the TU includes a prediction error, the TU decoder 3024 decodes QP update information (quantization correction value) and the quantization prediction error (residual coding) from the coded data. Note that the QP update information is a difference value from a quantization parameter prediction value qPpred, which is a prediction value of a quantization parameter QP.

(S2000: Generate prediction image) The prediction image generation unit 308 generates the prediction image based on the prediction information for each of the blocks included in the target CU.

(S3000: Inverse quantization and inverse transform processing) The inverse quantization and inverse transform processing unit 311 performs inverse quantization and inverse transform processing for each of the TUs included in the target CU.

(S4000: Generate decoded image) The addition unit 312 generates a decoded image of the target CU by adding the prediction image fed by the prediction image generation unit 308 and the prediction error fed by the inverse quantization and inverse transform processing unit 311.

(S5000: Loop filter) The loop filter 305 applies, to the decoded image, a loop filter such as a deblocking filter, a Sample Adaptive Filter (SAO), an ALF (AdaptiveLoopFilter), and the like, to generate a decoded image.

Scaling List

A scaling list means a method of performing different quantization and inverse quantization for each position of the transform coefficient and a matrix used for quantization. Quantization and inverse quantization are also referred to as scaling, and the scaling list is also referred to as a scaling factor. By using the scaling list, higher frequency components can be made smaller (made more likely to be 0) and the coding rate can be reduced with suppressing in the subjective image quality degradation. The image quality can be adjusted by controlling the ratio between high frequency components and low frequency components, the ratio among horizontal components, vertical components, and diagonal components.

The parameter decoder 302 includes a scaling list decoder 3026.

FIG. 14 illustrates an example of the scaling list (scaling factor). Here, an example of ScalingMatrixRec[8] [x] [y], x=0 . . . 7, y=0 . . . 7 for an 8×8 transform coefficient array d[x] [y], will be illustrated.

FIG. 15(a) illustrates an example in which the scaling list is transmitted as coded data for an APS. In the APS, aps_params_type indicates the type of information coded in the APS, and one APS data includes only information specified in the aps_params_type. For example, as the aps_params_type, ALF_APS of ALF data, LMCS_APS of the LMCS data, and SCALING_APS of the scaling list data may be provided.

As illustrated in the figure, the scaling list decoder 3026 decodes the Adaptation Parameter Set (APS). Then, in a case that the aps_params_type of APS indicates a separable transform scaling list (SCALING_APS), the above-described first scaling list scaling_list_data ( ) for a separable transform is decoded.

FIG. 15(b) illustrates a syntax configuration of the scaling list.

The scaling list decoder 3026 decodes, from the coded data, scaling_list_enabled_flag indicating whether to use the scaling list or not. In a case that scaling list enabled flag is 1, the scaling processing described below is performed using the scaling list.

The scaling list decoder 3026 decodes scaling list information referred to as scaling_list_data ( ) from the coded data, and derives the scaling list. The scaling list decoder 3026 may use a predetermined matrix (default matrix) that is not obtained by decoding the coded data.

The scaling list decoder 3026 decodes the scaling list ScalingList[id] [i] represented by a matrix identifier id.

As illustrated in FIG. 11, the matrix identifier id=0 . . . 27 may be used to determine a prediction mode and a color component and the larger size (max, (nTbW, nTbH)) of the width and height of the block. The prediction mode and the color component correspond to intra prediction and luminance (cIdx==0), intra prediction and Cb (cIdx==1), intra prediction and Cr (cIdx==2), inter prediction or intra block copy and luminance (cIdx==0), inter prediction or intra block copy and Cb (cIdx==1), and inter prediction or intra block copy and Cr (cIdx==2), and max (nTbW, nTbH) corresponds to 2, 4, 8, 16, 32, or 64.

The scaling_matrix_for_lfnst_disabled_flag is a flag that determines whether or not a scaling process for the transform coefficient using the quantization matrix is applied in a case that the non-separable transform is applied. And in a case that scaling_matrix_for_lfnst_disabled_flag is 1 and the non-separable transform is applied, the scaling list is not applied.

scaling_list_copy_mode flag is a flag indicating whether the scaling list used in the target block is the same as a reference scaling list. The reference scaling list is determined by scaling_list_pred_id_delta.

The scaling_list_pred_mode_flag is a flag indicating whether the scaling list used in the target block can be predicted from the reference scaling list. scaling_list_pred_mode_flag=0 indicates that the scaling list can not be predicted from the referenced scaling list, and the scaling list decoder 3026 explicitly decodes the scaling list. In a case that scaling_list_pred_mode_flag is not signalled, scaling_list_pred_mode_flag is set equal to 0.

scaling_list_pred_id_delta determines the reference scaling list to predict the scaling list for the target block. In a case that scaling_list_pred_id_delta is not signalled, scaling_list_pred_id_delta is set equal to 0.

Decoding of Scaling List

Processing of the scaling list will be described with reference to a scaling list syntax configuration in FIG. 15.

For each scaling list type id, the scaling list decoder 3026 decodes a one-dimensional list ScalingList[id] [i] for each DiagonalScan at the position i.

The scaling list decoder 3026 decodes the flag scaling_matrix_for_lfnst_disabled_flag determining whether to apply the scaling processing or not in a case that the non-separable transform is applied. Then, the scaling list decoder 3026 decodes scaling_list_copy_mode_flag[id] indicating whether to use the same scaling list as the decoded scaling list (reference scaling list). In a case that the same scaling list is not used, the scaling list decoder 3026 decodes a flag scaling_list_pred_mode_flag[id] indicating whether to predict from the decoded scaling list (reference scaling list) or not. In a case that the same scaling list is used or the scaling list is predicted (for scaling_list_copy_mode_flag[id]==1 or scaling_list_pred_mode_flag[id]==1), the scaling list decoder 3026 decodes scaling_list_pred_id_delta [id], representing the reference scaling list. Then, the scaling list decoder 3026 performs the following processing.

First, the scaling list decoder 3026 derives refId from scaling_list_pred_id_delta and derives the size of the scaling list from the matrix identifier id.

refId=id−scaling_list_pred_id_delta[id]
matrixSize=(id<2) ?2: ((id<8) ?4:8)

Then, the scaling list decoder 3026 references the existing scaling list referenced by using refId, to derive, for each of the following cases, a two-dimensional array ScalingMatrixPred[x] [y] of (matrixSize) x (matrixSize) (x=0 . . . matrixSize−1, y=0 . . . matrixSize−1) and the value ScalingMatrixDCPred of a low frequency component (DC component) of the scaling list for derivation.

In a case that scaling_list_copy_mode_flag[id] and scaling_list_pred_mode_flag[id] are both 0, the scaling list decoder 3026 sets ScalingMatrixPred[x] [y] to 8 and ScalingMatrixDCPred to 8.

Otherwise, in a case that scaling_list_pred_id_delta[id] is 0, the scaling list decoder 3026 sets ScalingMatrixPred[x] [y] to 16 and ScalingMatrixDCPred to 16.

Otherwise (in a case that one of scaling_list_copy_mode_flag[id] or scaling_list_pred_mode_flag[id] is 1, and scaling_list_pred_id_delta[id] is equal to or greater than 1), the scaling list decoder 3026 sets ScalingMatrixPred[x] [y] to ScalingMatrixRec[refId] [x] [y] and sets ScalingMatrixDCPred by using the formula below.

ScalingMatrixDCPred=refId>13 ? ScalingMatrixRec[refId−14] [0] [0]: ScalingMatrixPred[0] [0]

Subsequently, in a case that the same scaling list as the reference scaling list is not used (scaling_list_copy_mode_flag[id] is 0), the scaling list decoder 3026 derives the scaling list ScalingMatrixRec[id] to apply to the target block.

In a case that the matrix identifier id is greater than 13, the scaling list decoder 3026 decodes scaling list_dc_coef[id−14]. In a case that the scaling_list_dc_coef is not signalled, the scaling list decoder 3026 sets the value to 0. The scaling list decoder 3026 uses scaling_list_dc_coef to derive ScalingMatrixDCRec indicating the value of the DC component of the scaling list ScalingMatrixRec.

ScalingMatrixDCRec[id−14]=(ScalingMatrixDCPred+scaling list_dc_coef[id−14]+256) % 256)

The scaling list decoder 3026 decodes, for each position k on DiagonalScan in the array d[ ] [ ] of transform coefficients, scaling_list_delta_coef[id] [i] indicating a difference between a coefficient in the scaling list to be derived and the preceding coefficient. In a case that the same scaling list as the reference scaling list is used (scaling_list_copy_mode_flag[id] is 1), scaling_list_delta_coef is not signalled and scaling list_delta_coef is set equal to 0. The scaling list decoder 3026 uses scaling list_delta_coef to derive a two-dimensional array ScalingMatrixRec[id] [x] [y] of (matrixSize)×(matrixSize) to be applied to the target block.

ScalingMatrixRec[id] [x] [y]=(ScalingMatrixPred[x] [y]+ScalingList[id] [k]+256) % 256)

Here, k is in the range of 0 to matrixSize matrixSize−1, where x and y represent a position on the two-dimensional array represented by a position k on DiagonalScan, and represented by the formula below.

x=DiagScanOrder[Log2(matrixSize)] [Log2(matrixSize)] [k] [0]

y=DiagScanOrder[Log2(matrixSize)] [Log2(matrixSize)] [k] [1]

Scaling Unit 31111

The scaling unit 31111 scales a quantization transform coefficient qd[ ] [ ] input from the entropy decoder 301 by using a weight of every coefficient.

In a case that non-separable transform is not performed (in a case that lfnst_idx==0 or that the width or height of the TU block is smaller than 4), the scaling unit 31111 may determine whether to perform the scaling or not depending on the presence of the non-separable transform. This is because the transform coefficient corresponds to a spatial frequency, while the transform coefficient does not correspond to the spatial frequency in a case that the non-separable transform is performed (lfnst_idx !=0 and both the width and height of the TU block are equal to or greater than 4). Hereinafter, an example will be described in which scaling is performed depending on the presence of the non-separable transform by using the separable transform scaling list decoded by the scaling list decoder 3026 and the flag scaling_matrix_for_lfnst_disabled_flag indicating whether to apply the scaling list in case of the non-separable transform.

Description of Scaling by Scaling List Decoder 3026 and Scaling Unit 31111

The scaling unit 31111 in the present embodiment switches between a scaling list used in a case that the non-separable transform is applied and a scaling list used in a case that the non-separable transform is not applied, and scales the quantization transform coefficient. Specifically, the scaling unit 31111 switches the quantization matrix by using the scaling list input from the scaling list decoder 3026 and scaling_matrix_for_lfnst_disabled_flag. This provides an option to refrain from scaling in a case that the non-separable transform is applied. As a result, the non-separable transform can be preferably applied.

Inverse Quantization and Inverse Transform Processing Unit 311

Figure 10:
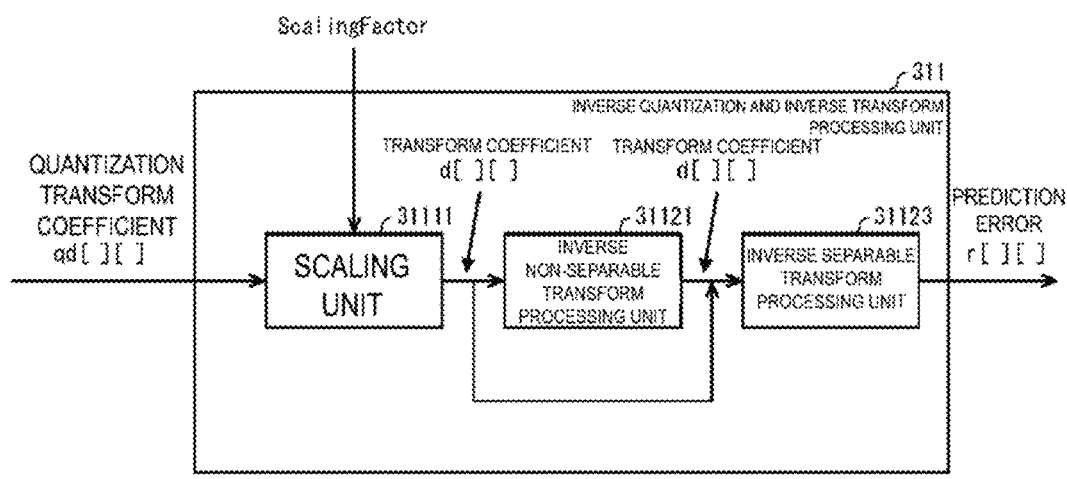
FIG. 10 is a functional block diagram illustrating a configuration example of an inverse quantization and inverse transform processing unit.

FIG. 10 is a schematic block diagram illustrating a configuration of the inverse quantization and inverse transform processing unit 311 according to the present embodiment. The inverse quantization and inverse transform processing unit 311 includes a scaling unit 31111, an inverse non-separable transform processing unit 31121, and an inverse separable transform processing unit 31123.

The inverse quantization and inverse transform processing unit 311 calculates a transform coefficient d[ ][ ] by using the scaling unit 31111 to scale (inverse quantize) the quantization transform coefficient qd[ ][ ] input from the entropy decoder 301. The quantization transform coefficient qd[ ][ ] is a coefficient obtained in coding processing by performing a transform such as Discrete Cosine Transform (DCT), Discrete Sine Transform (DST), and quantization for a prediction error, or transform coefficient by performing further non-separable transform. The inverse quantization and inverse transform processing unit 311 uses the inverse non-separable transform processing unit 31121 to transform in a case that lfnst_idx !=0. Furthermore, the inverse quantization and inverse transform processing unit 311 performs an inverse frequency transform such as an inverse DCT or an inverse DST on transform coefficient to calculate a prediction error. In a case of lfnst_idx==0, instead of processing by the inverse secondary transform processing unit 31121, an inverse frequency transform such as an inverse DCT or an inverse DST is performed on the transform coefficient scaled by the scaling unit 31111 to calculate a prediction error. The inverse quantization and inverse transform processing unit 311 outputs the calculated prediction error to the addition unit 312.

Note that the inverse transform and the transform are paired processing and may thus be interpreted by replacing the transform and the inverse transform with each other. Alternatively, in a case that the inverse transform is referred to as a transform, the transform may be referred to as forward transform. For example, in a case that the inverse non-separable transform is referred to as non-separable transform, the non-separable transform may be referred to as forward non-separable transform. The separable transform is simply referred to as transform.

Details of Scaling Unit 31111

The scaling list in a case that the inverse non-separable transform is applied in the scaling unit 31111 in the present embodiment will be described in detail.

The scaling unit 31111 uses the quantization parameter derived in the parameter decoder 302 and the scaling list to scale the transform coefficient decoded by the TU decoder using the weight of every coefficient.

Here, the quantization parameter qP is derived as follows by using a colour component cIdx of the target transform coefficient and a joint chrominance residual coding flag tu_joint_cbcr_flag.

qP=qPY (cIdx==0)
qP=qPCb (cIdx==1 && tu_joint_cbcr_flag ==0)
qP=qPCr (cIdx==2 && tu_joint_cbcr_flag ==0)
qP=qPCbCr (tu_joint_cbcr_flag !=0)

The scaling unit 31111 derives a value rectNonTsFlag related to the shape from the size (nTbW, nTbH) of the target TU.

rectNonTsFlag=(((Log2 (nTbW)+Log2 (nTbH)) & 1)==1 && transform skip_flag[xTbY] [yTbY]==0)

rectNonTsFlag is 1 in a case that the shape is not a square and that transform skip is not performed.

The scaling unit 31111 may scale the transform coefficient dependent on the position (x, y) of the transform coefficient as follows, by using the quantization matrix ScalingMatrixRec[ ][ ] derived in the scaling list decoder 3026.

In a case that any of the following conditions is true, the scaling unit 31111 sets m[x] [y] as follows:

m[x] [y]=16     (Formula ScaleVal-1),

And the scaling unit 31111 performs scaling based on a fixed value (uniform quantization) instead of depending on the position of the transform coefficient.

sps_scaling_list_enabled_flag is 0
pic_scaling_list_present_flag is 0
in a case that transform skipping is enabled (transform_skip_flag==1)
1) In a case that scaling_matrix_for_lfnst_disabled_flag is 1, and 2) lfnst_idx !=0

The condition 2) of the final conditions may be a condition in which the non-separable transform is applied depending on the target transform block (e.g., transform block size, luminance or chrominance). That is, lfnst_idx !=0 and the width (nTbW) and height (nTbH) of the transform block may both be equal to or greater than a prescribed size (nTbW>=4 && nTBH>=4). A variable LfnstEnabledFlag that indicates whether lfnst_idx is other than 0 and that the size of the transform block is equal to or greater than the prescribed size may be derived as follows.

LfnstEnabledFlag=lfnst_idx && nTbW>=4 && nTbH>=4 ?1:0

And, the condition 2) may replace with LfnstEnabledFlag being 1.

Furthermore, as a condition in which the non-separable transform is applied depending on the transform block, lfnst_idx being other than 0 and the target block being luminance (cIdx==0) may be used.

LfnstEnabledFlag=lfnst_idx && cIdx==0

In this way, for derivation of m[ ][ ] scaling_matrix_for_lfnst_disabled_flag and the condition of whether the non-separable transform is applied or not are used. Thus, in the inverse transform processing unit in which the non-separable transform is applied depending on the transform block size, an effect is produced in which an option to refrain from scaling the transform coefficient using the quantization matrix is enabled in a case that the non-separable transform is applied.

Otherwise, the scaling unit 31111 uses a quantization matrix scaling list. At this time, the scaling unit 31111 references FIG. 11 based on the prediction mode (predMode), the color component (cIdx), and the width (nTbW) and height (nTBH) of the TU block to derive the matrix identifier id, and the size log2MatrixSize of the scaling list is derived. log2MatrixSize is the logarithm of 2 of the size of scaling list.

log2MatrixSize=(id<2) ? 1: (id<8) ? 2:3

The scaling unit 31111 derives m[ ] [ ] as follows.

m[x] [y]=ScalingMatrixRec[id] [i] [j]     (Formula ScaleVal-2)

Here, i=(x<<log2MatrixSize)>>Log2 (nTbW), j=(y<<log2MatrixSize)>>Log2 (nTbH).

In a case that the size of the quantization matrix (the size of the transform block to which the quantization matrix is applied) is greater than the prescribed size, for example, in a case that the matrix identifier id is greater than a prescribed value (here 13), a DC component m[0] [0] of the scaling list is further derived.

m[0] [0]=ScalingMatrixDCRec [id−14]

Figure 16:
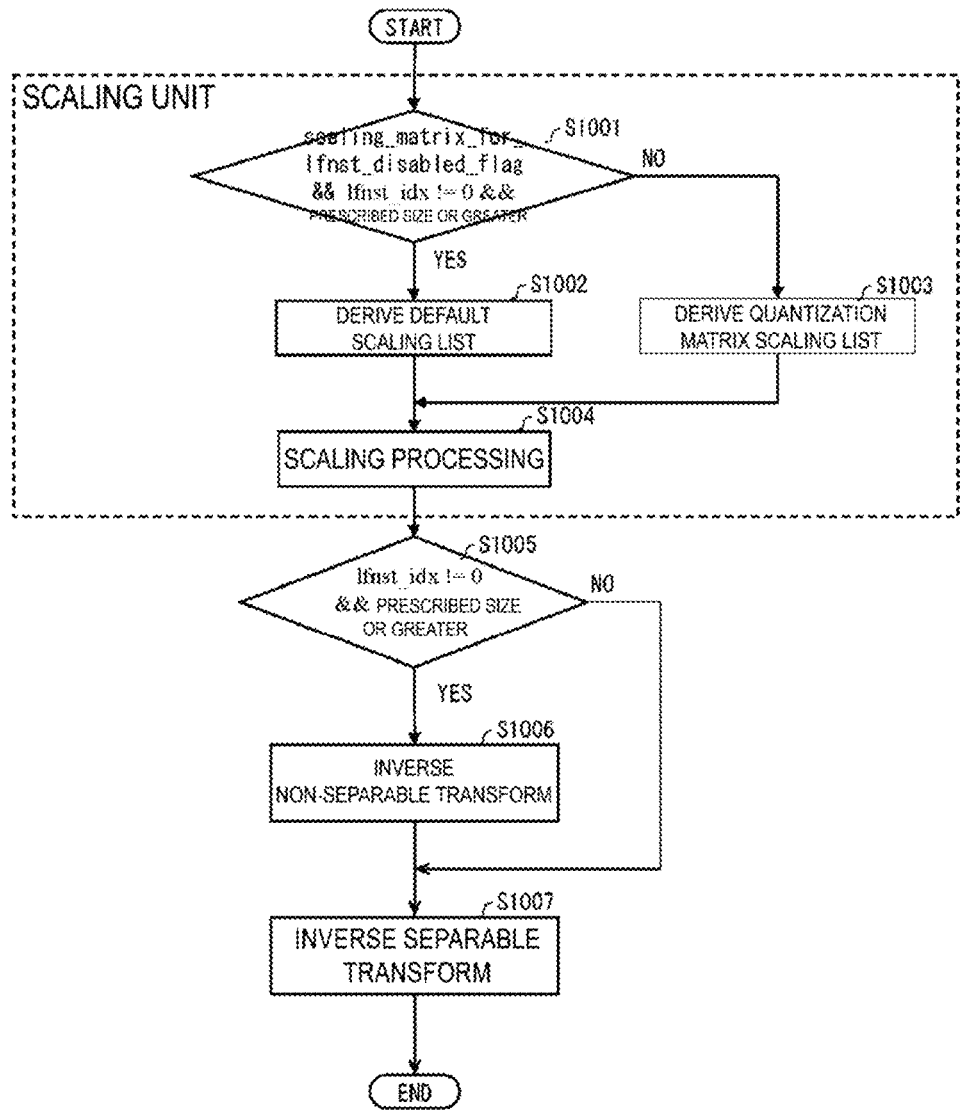
FIG. 16 is a flowchart illustrating a flow of processing in the inverse quantization and inverse transform processing unit.

FIG. 16 illustrates a flow chart of the quantization processing for the final condition in a case that the scaling (uniform quantization) is performed based on a fixed value instead of depending on the position of the transform coefficient. The scaling unit 31111 derives a fixed value (for example, 16) for the scaling list m[x] [y] as indicated in (Formula ScaleVal-1) in a case that all of the following are satisfied (YES in S1001):

1) scaling_matrix_for_lfnst_disabled_flag is 1, and
2) lfnst_idx !=0, and
3) the width (nTbW) and height (nTbH) of the transform block are both equal to or greater than the prescribed size (S1002).

m[x] [y]=16

In a case that the above condition is not satisfied (NO in S1001), the value ScalingMatrixRec[id] [i] [j] depending on the position (x, y) of the transform coefficient is derived as the scaling list m[x] [y] as indicated in (Formula ScaleVal-2) (S1003). The scaling unit 31111 finally performs scaling processing using the derived scaling list (S1004).

Figure 17:
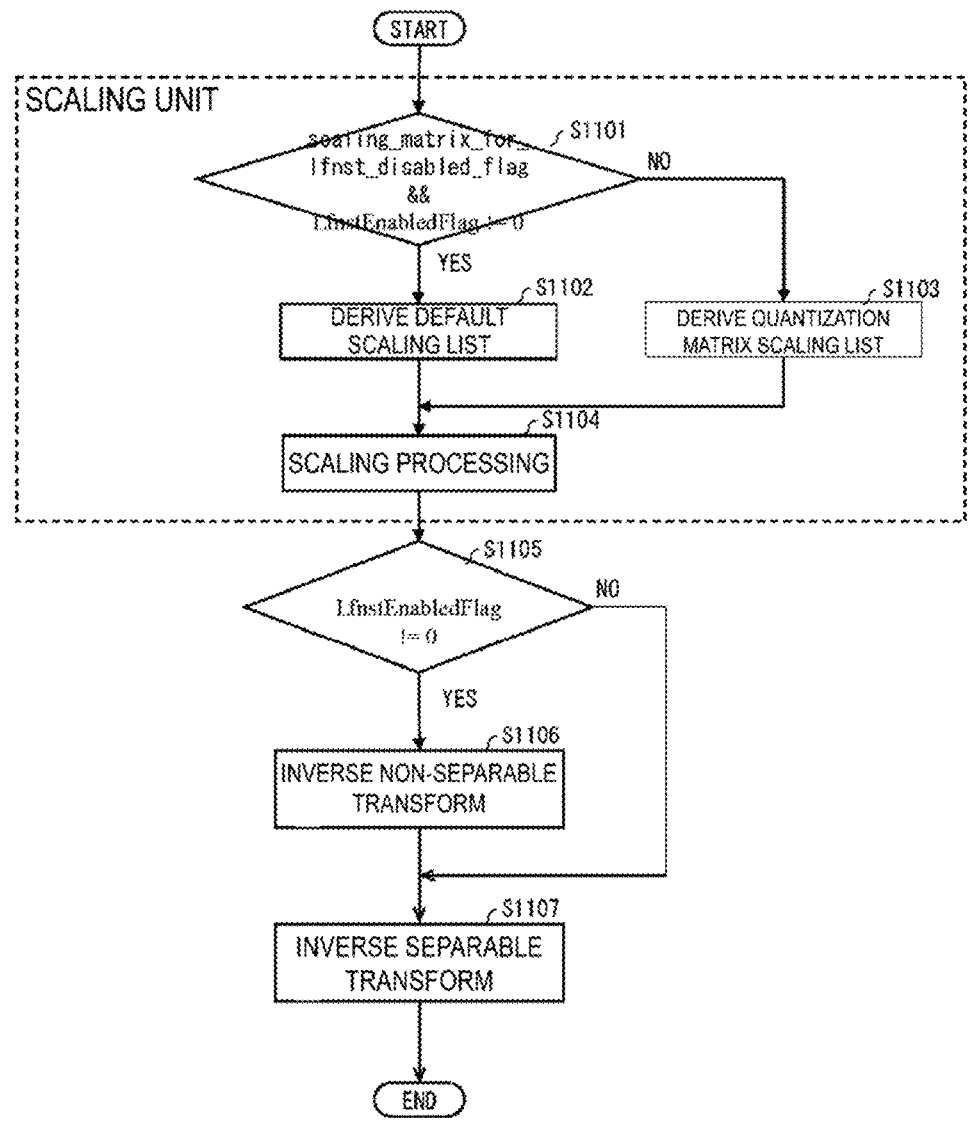
FIG. 17 is a flowchart illustrating the flow of processing in the inverse quantization and inverse transform processing unit.

FIG. 17 is a flowchart of quantization processing using the variable LfnstEnabledFlag indicating that the lfnst_idx is other than 0 and that the size of the transform block is equal to or greater than the prescribed size. The scaling unit 31111 derives a fixed value (for example, 16) for the scaling list m[x] [y] as indicated in (Formula ScaleVal-1) in a case that scaling_matrix_for_lfnst_disabled_flag is 1 and that LfnstEnabledFlag is 1 (YES in S1101) (S1102). In a case that the above-described condition is not satisfied (NO in S1101), the value Scaling MatrixRec[id] [i] [j] depending on the position (x, y) of the transform coefficient is derived for the scaling list m[x] [y] as indicated in (Formula ScaleVal-2) (S1103). The scaling unit 31111 finally performs scaling processing using the derived scaling list (S1104).

Scaling Processing

The scaling unit 31111 derives an actual scaling list ls[x] [y] from m[ ] [ ] and the quantization parameter qP. For example, a modified value obtained by referencing the array levelScale by qP is multiplied to m[ ] [ ], and shifting by a value dependent on qP.

ls[x] [y]=(m[x] [y]*levelScale[rectNonTsFlag] [qP %6])<<(qP/6) Or ls[x] [y] may be derived by using the formula below.

ls[x] [y]=(m[x] [y]*levelScale[rectNonTsFlag] [(qP+1) %6])<<((qP+1)/6)

Here, levelScale[ ] [ ]={{40, 45, 51, 57, 64, 72}, {57, 64, 72, 80, 90, 102}}.

The scaling unit 31111 derives dnc[ ] [ ] from the product of the actual scaling list ls[ ] [ ] and the decoded transform coefficient TransCoeffLevel, and performs inverse quantization.

dnc[x] [y]=(TransCoeffLevel[xTbY] [yTbY] [cIdx] [x] [y]*ls[x] [y]+bdOffset)>>bdShift Finally, the scaling unit 31111 clips the inverse quantized transform coefficient and derives d[x] [y].

d[x] [y]=Clip3 (CoeffMin, CoeffMax, dnc[x] [y])

d[x] [y] is transmitted to the inverse separable transform processing unit 31123 or the inverse non-separable transform processing unit 31121. The non-separable transform processing unit (second transform processing unit) 31121 applies the non-separable transform to the transform coefficient d[ ] [ ] after inverse quantization and before a separable transform.

The inverse non-separable transform processing unit 31121 reconstructs a modified transform coefficient (transform coefficient resulting from the non-separable transform processing unit) d[ ] [ ] by applying a transform with a transform matrix to some or all of the transform coefficients d[ ] [ ] received from the scaling unit 31111. The inverse non-separable transform processing unit 31121 applies an inverse non-separable transform to the transform coefficient d[ ] [ ] in prescribed unit for each transform unit TU. The non-separable transform is applied only in intra CUs, and the transform basis is determined with reference to the intra prediction mode IntraPredMode. Selection of the transform basis will be described below. The inverse non-separable transform processing unit 31121 outputs the reconstructed modified transform coefficient d[ ] [ ] to the inverse separable transform processing unit 31123.

The separable transform processing unit 31123 acquires the transform coefficient d[ ] [ ] or a modified transform coefficient d[ ] [ ] reconstructed by the inverse non-separable transform processing unit 31121, and transform to derive a prediction error r[ ] [ ]. Then, scaling corresponding to a bit depth (bitDepth) is performed on r[ ] [ ] to derive an error resSamples [ ] [ ] with the same accuracy as that of the prediction image derived by the prediction image generation unit 308. For example, the scaling is represented as follows.

resSamples[x] [y]=(r[x] [y] +(1<<(bdShift−1)))>>bdShift bdShift=Max(20−bitDepth, 0)     (Formula BD-1)

In this calculation, a shift operation is performed to obtain resSamples [ ] [ ] with a bitDepth accuracy from r[ ] [ ] with an accuracy of 20 bits. Note that the value indicating the accuracy is not limited to 20 but that another value between 8 and 24 may be used (this also applies to the description below). The scaling according to bitDepth may be performed by a bit depth scale unit (not illustrated) provided in the apparatus. The derived error is output to the addition unit 312.

The joint error derivation unit 3113 uses a prediction error r[ ] [ ] of a first color component (cIdx=cIdx0) to derive a prediction error resSamples[ ] of a second color component (e.g., cIdx=cIdx1). The color component can be identified by cIdx, and for example, cIdx=0 indicates luminance, cIdx=1 indicates chrominance Cb, cIdx=2 indicates chrominance Cr. Note that the joint error derivation unit 3113 performs no luminance processing and thus that cIdx0 and cIdx1 are 1 or 2 (this also applies to the description below). resSamples[ ] [ ] of cIdx==1 is designated as resSamplesCb[ ] [ ] or resCb[ ] [ ]. resSamples[ ] [ ] of cIdx==2 is designated as resSamplesCr[ ] [ ] or resCr[ ] [ ]. The joint error derivation unit 3113 may use addition and difference of prediction errors r[ ] [ ] of two color components (cIdx=cIdx0, cIdx=cIdx1) to derive resSamples [ ] [ ] [ ] of two color components (cIdx=cIdx0, cIdx=cIdx1). The joint error derivation unit 3113 may perform a shift operation dependent on the bitDepth of the image as described below to derive resSamples[ ] [ ] of the second color component (e.g., cIdx=cIdx1) by using the prediction error r[ ] [ ] of the first color component (cIdx=cIdx0). Note that the variables cIdx0 and cIdx1 indicating particular color components may be 1 and 2 (Cr is derived from Cb) or 2 and 1 (Cb is derived from Cr). Additionally, the relationship is satisfied in which cIdx1=2 in a case of cIdx0=1 and in which cIdx1=1 in a case of cIdx0=2. That is, the relationship cIdx1=3−cIdx0 is satisfied.

Description of Non-Separable Transform and Inverse Non-Separable Transform

The non-separable transform (second transform) is applied in the video coding apparatus 11 to transform coefficients in some or all of the regions resulting from the separable transform (such as DCT2 and DST7) of the TU. In the non-separable transform, correlations remaining in the transform coefficients are removed and energy is concentrated on some transform coefficients. The inverse non-separable transform is applied in the video decoding apparatus 31 to the transform coefficients in some or all of the regions of the TU. After the inverse non-separable transform is applied, the inverse separable transform (such as DCT2 and DST7) is applied to the transform coefficients resulting from the inverse non-separable transform. In a case that the TU is split into 4×4 subblocks, the non-separable transform and the inverse non-separable transform are applied to only the upper left prescribed subblock. For the size of the TU including the width W and the height H, examples in which one of the width W and height H is 4 include 4×4, 8×4, 4×8, L×4, and 4×L (L is a natural number equal to or greater than 16).

A technique for transmitting only some low frequency components of the transform coefficient resulting from the separable transform is referred to as "Reduced Secondary Transform (RST)" or "Low Frequency Non-Separable Transform (LFNST)". Specifically, in a case that the number nonZeroSize of transform coefficients for the separable transform for transmission is equal to or smaller than the size of the separable transform (1<<log2StSize×1<<log2StSize), LFNST is used.

In the non-separable transform and the inverse non-separable transform, the following processing is performed according to the size of the TU and the intra prediction mode (IntraPredMode).

The processing of the inverse non-separable transform will be described in order below.

Figure 18:
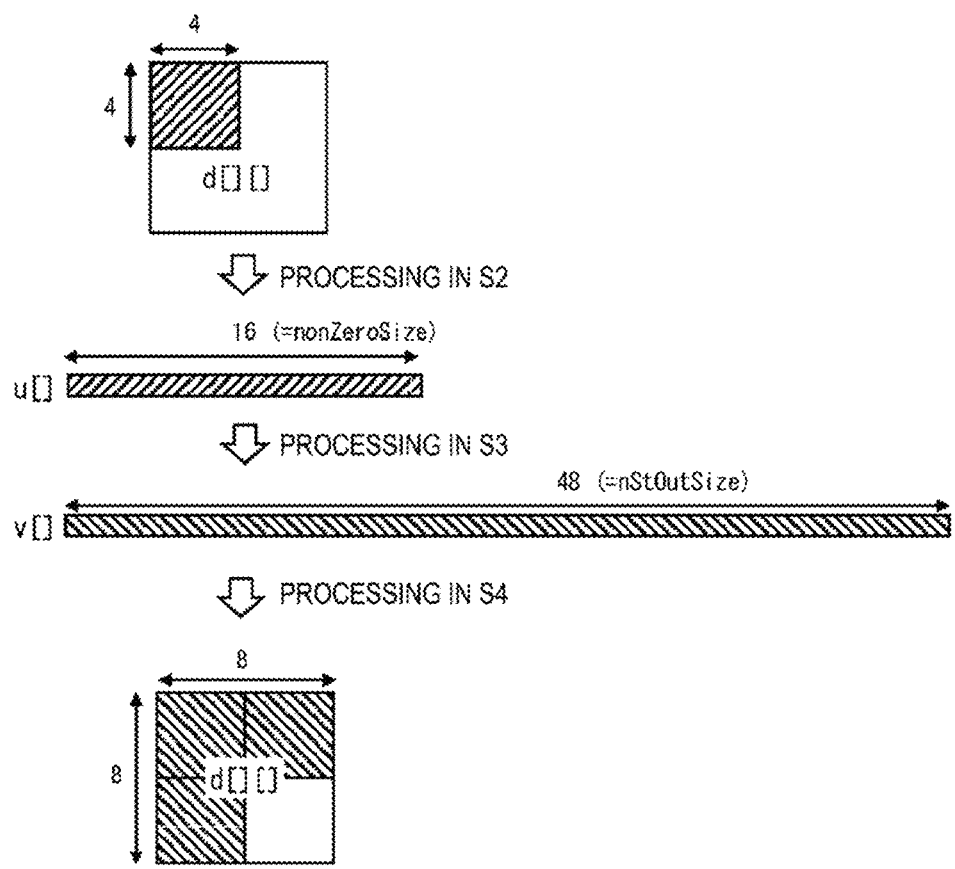
FIG. 18 is a diagram illustrating a non-separable transform.

FIG. 18 is a diagram illustrating the non-separable transform. FIG. 18 illustrates processing performed on an 8×8 TU. In processing in S2, the transform coefficient d[ ] [ ] [ ] for a 4×4 region is stored in a one-dimensional array u[ ] with nonZeroSize. In processing in S3, the one-dimensional array u[ ] is transformed into a one-dimensional array v[ ]. Finally, in processing in S4, the one-dimensional array u[ ] is stored again in d[ ] [ ].

S1: Set Transform Size and I/O Size

In the inverse non-separable transform, the following are derived according to the size of the TU (width W, height H): the size of the inverse non-separable transform (4×4 or 8×8), the number of transform coefficients in the output (nStOutSize), the number of transform coefficients to apply (transform coefficient in the input) (nonZeroSize), and the number of subblocks to which the inverse non-separable transform is applied (numStX, numStY). The size of the inverse non-separable transform of 4×4 or 8×8 is indicated by nStSize=4 or 8. The size of the inverse non-separable transform of 4×4 or 8×8 may be referred to as RST4×4 or RST8×8, respectively.

In the inverse non-separable transform, in a case that the size of the TU is equal to or greater than the prescribed size, the inverse non-separable transform of RST8×8 output 48 transform coefficients. Otherwise, the inverse non-separable transform of RST4×4 output 16 transform coefficients. In a case that the TU is 4×4, 16 transform coefficients are derived from 8 transform coefficients by using RST4×4 and in a case that the TU is 8×8, a transform coefficient of 48 is derived from a transform coefficient of 8 by using RST8×8. In other cases, 16 or 48 transform coefficients are output from 16 transform coefficients according to the size of the TU.

In a case that W and H are both equal to or greater than 8, log2StSize=3 and nStOutSize=48

In the other cases, log2StSize =2 and nStOutSize=16
nStSize=1<<log2StSize

In a case that W and H are both 4 or correspond to 8×8, nonZeroSize=8

In the other cases, nonZeroSize=16

Note that the input nonZeroSize of the LFNST is not limited to 8 or 16. For example, the input nonZeroSize of the LFNST may be 12 or the like. The output nStOutSize is also not limited to 16 or 48, and may be 32, 36, 64, or the like.
numStX=(nTbH==4 && nTbW>8) ? 2:1
numStY=(nTbH==4 && nTbW>8) ? 2:1

Note that, without the non-separable transform on multiple subblocks, numStX =numStY may be always set.

S2: Sort Transform Coefficients into One-Dimensional Signal

The inverse non-separable transform processing unit 31121 temporarily sorts some of the transform coefficients d[ ] [ ] for the TU into one-dimensional array u[ ]. Specifically, the inverse non-separable transform processing unit 31121 references the transform coefficient of x=0 . . . nonZeroSize−1 to derive u[ ] from the two-dimensional transform coefficient d[ ] [ ] of the target TU indicated by the region RU. xC and yC indicate a position on the TU and are derived from an array DiagScanOrder indicating a scan order and the transform coefficient position x in the subblock.
xC=(xSbIdx<<log2StSize)+DiagScanOrder[log2StSize][log2StSize] [x] [0]
yC=(ySbIdx<<log2StSize)+DiagScanOrder[log2StSize][log2StSize] [x] [1]
u[x]=d[xC] [yC]

Note that the range copied to the one-dimensional array is referred to as the region RU.

S3: Apply Transform Processing

The inverse non-separable transform processing unit 31121 performs a transform using a transform matrix secTransMatrix[ ] [ ] on u[ ] having a length of nonZeroSize, to derive, as an output, a coefficient v'[ ] of a one-dimensional array having a length of nStOutSize.

Specifically, the inverse non-separable transform processing unit 31121 derives, from a set number (stTrSetId) for non-separable transform derived from the intra prediction mode IntraPredMode, lfnst_idx indicating the transform basis for non-separable transform to be decoded from the coded data, and the non-separable transform size nStSize (nTrS), a corresponding transform matrix secTranMatrix[ ] [ ]. Furthermore, as illustrated in the formula below, the inverse non-separable transform processing unit 31121 performs a product-sum operation between the transform matrix and the one-dimensional variable u[ ]. v[i]=Clip3 (CoeffMin, CoeffMax, Σ (secTransMatrix[i] [j]*u[i]+64)>>7)

Here, Σ is a sum for j=0 . . . NonZeroSize−1. i indicates processing on 0 . . . nStSize−1. CoeffMin and CoeffMax indicate a range of values for the transform coefficient.

S4: Two-Dimensional Arrangement of One-Dimensional Signal Resulting from Transform Processing The inverse non-separable transform processing unit 31121 arranges the coefficients v'[ ] of the transformed one-dimensional array at prescribed positions in the TU again. The arrangement method may be changed depending on PredModeIntra.

Specifically, for PredModeIntra<=34, the following processing may be applied.

$$d[x][y]=(y<4) ? v[x+(y<<log2StSize)]: ((x<4) ? v[32+x+((y-4)<<2)]: d[x][y])$$

Otherwise, the formula below is applied.

$$d[x][y]=(x<4) ? v[y+(x<<log2StSize)]: ((y<4) ? v[32+y+((x-4)<<2)]: d[x][y])$$

The determination of the branch described above may be "PredModeIntra<=34 or INTRA_LT_CCLM, INTRA_T_CCLM, or INTRA_L_CCLM".

Inverse Separable Transform Processing Unit 31123

The inverse separable transform processing unit 31123 applies the inverse separable transform to a coefficient (transform coefficient) resulting from a transform performed by the inverse non-separable transform processing unit 31121. In the inverse separable transform processing unit 31123, the transform coefficient resulting from the transform performed by the inverse non-separable transform processing unit 31121 may apply the inverse separable transform to the coefficient (transform coefficient) scaled by the scaling unit 31111. The inverse separable transform processing unit 31123 is a means for performing two one-dimensional transforms in the vertical direction and the horizontal direction, and is typically referred to as a transform processing unit. Note that the inverse separable transform processing unit 31123 may apply a case in which one or both of the operations in the vertical direction and the horizontal direction are skipped and only the conversion of the transform coefficient level (scaling) is performed.

The inverse separable transform processing unit 31123 selects and determines a transform matrix in the vertical direction and the horizontal direction from multiple candidates.

In a case that the transform matrix is determined from multiple candidates, an explicit MTS and an implicit MTS are available. For the explicit MTS, the mts_idx is decoded from the coded data and the transform matrix is switched. For the implicit MTS, mts_idx is derived depending on the intra prediction mode or block size and the transform matrix is switched.

The inverse separable transform processing unit 31123 sets an implicit MTS flag (implicitMtsEnabled) to 1 in a case that the MTS is enabled (sps_mts_enabled_flag==1) and (intra-coding is used with the intra subblock splitting being on or the subblock transform flag being on or the explicit MTS being off, and the non-separable transform being off and the MIP prediction being off).

More specifically, the inverse separable transform processing unit 31123 sets implicitMtsEnabled=1 in a case that one of the following conditions is satisfied:

In a case that the intra subblock division is on (IntraSubPartitionsSplitType !=ISP_NO_SPLIT)

In a case that the subblock transform flag is on and the size of the TU is smaller than the prescribed size (cu_sbt_flag==1 and Max (nTbW, nTbH)<=32)

1) The explicit MTS flag sps_explicit_mts_intra_enabled_ flag is 0, and 2) CuPredMode indicates an intra prediction mode, and 3) lfnst_idx is 0, 4) intra_mip_ flag is 0.

The final condition 3) may be such that the non-separable transform is not applied (lfnst_idx==0) or either the width (nTbW) or height (nTbH) of the transform block is smaller than the prescribed size (e.g., 4) (nTbW<4 | | nTBH <4). Additionally, a variable LfnstEnabledFlag that indicates whether lfnst_idx is other than 0 and that the size of the transform block is equal to or greater than the prescribed size may be derived as follows.

LfnstEnabledFlag=lfnst_idx && nTbW>=4 && nTbH>=4 ? 1:0

And the condition in 3) may replace with LfnstEnabledFlag being 0.

Furthermore, as a condition in which the non-separable transform is applied depending on the transform block, lfnst_idx being other than 0 and the target block being luminance (cIdx==0) may be used.

LfnstEnabledFlag=lfnst_idx && cIdx==0

In this way, implicitMtsEnabled=1 is derived by using, in addition to lfnst_idx, the decision whether transform block size equals to or greater than the prescribed size (nTbW>=4 && nTbH>=4) for switching of the non-separable transform. This allows the utilization of implicit MTS in which the DCT2 and the transform other than the DCT2 (e.g., the DST7) are switched to each other only in a case that the non-separable transform is off. The Implicit MTS has the effect of increasing coding efficiency because the transform is efficiently performed in a case that the non-separable transform is off.

In a case of the implicit MTS (implicitMtsEnabled==1), the transform types tyTypeHor and tyTypeVer are determined depending on the intra prediction mode IntraPredMode and the TU size.

The TU decoder 3024 sets trTypeHor=trTypeVer=0 (=DCT2) in a case that the target block is not luminance (cIdx>0) or the intra subblock splitting is on and the non-separable transform is not utilized in the target block (IntraSubPartitionsSplitType !=ISP_NO_SPLIT and LfnstEnabledFlag !=0).

In this way, in addition to the lfnst_idx transmitted for luminance and chrominance, the decision whether transform block size equals to or greater than the prescribed size (nTbW>=4 && nTbH>=4) for switching of the non-separable transform is used to derive the transform matrix to allow the DCT2 to be constantly utilized in a case that the non-separable transform is on. The DCT2 is limitedly utilized in a case that the non-separable transform is on, and thus the transform is efficiently performed, leading to the effect of improving coding efficiency.

In the cases other than the above-described cases, in a case of the implicit MTS (implicitMtsEnabled ==1) and in a case that the intra subblock splitting is on or the explicit intra transform is off in the intra mode as follows, the TU decoder 3024 sets either 0 (DCT2) or 1 (DST7) as tyTypeHor, tyTypeVer according to the TU size (width nTbW, height nTbH).

(IntraSubPartitionsSplitType !=ISP_NO_SPLIT or sps_explicit_mts_intra_enabled_flag==0 and CuPredMode== MODE_INTRA)

trTypeHor=(nTbW>=4 && nTbW<=16 && nTbW<=nTbH) ? 1:0 trTypeVer 32 (nTbH>=4 && nTbH<=16 && nTbH<=nTbW) ? 1:0

Note that the prescribed range is not limited to the above-described range. For example, the following may be used.

trTypeHor =(nTbW >=4 && nTbW<=8 && nTbW<=nTbH) ? 1:0 trTypeVer =(nTbH >=4 && nTbH<=8 && nTbH<=nTbW) ? 1:0

The inverse separable transform processing unit 31123 transforms the modified transform coefficient d[ ] [ ] (for example, the transform coefficient resulting from an inverse secondary transform) to an intermediate value e[ ] [ ] using a vertical one-dimensional transform, and clips the intermediate value e[ ] [ ]. The inverse separable transform processing unit 31123 transforms an intermediate value g[ ] [ ] to a prediction residual r[ ] [ ] using a horizontal one-dimensional transform, and transmits the prediction residual r[ ] [ ] to the addition unit 312.

More specifically, the inverse separable transform processing unit 31123 derives a first intermediate value e[x] [y] by using the formula below.

$$e[x][y] = \Sigma(transMatrix[y][j] \times d[x][j]) \quad (j=0 \ldots nTbS-1)$$

Here, transMatrix[ ] [ ] (=transMatrixV[ ] [ ]) is a transform basis represented by a matrix of nTbS×nTbS derived using trTypeVer. nTbS is the height nTbH of the TU. For a 4x4 transform (nTbS=4) of the DCT2 of trType==0, for example, transMatrix={{29, 55, 74, 84} {74, 74, 0, −74} {84, −29, −74, 55} {55, −84, 74, −29}} is used. The symbol E means processing for adding the product of a matrix transMatrix[y] [j] and a transform coefficient d[x] [j] for the index j=0 . . . nTbS−1. That is, e[x] [y] is obtained by arranging columns obtained from the product of a vector x[j] (j=0 . . . nTbS−1) including d[x] [j] (j=0 . . . nTbS−1) corresponding to each column of d[x] [y] and a matrix element transMatrix[y] [j].

The inverse separable transform processing unit 31123 clips a first intermediate value e[x] [y] and derives a second intermediate value g[x] [y] in accordance with the formula below.

$$g[x][y] = Clip3(coeffMin, coeffMax, (e[x][y] + 64) >> 7)$$

64 and 7 in this formula are numerical values determined from the bit depth of the transform basis, and in the formula, are assumed to be in 7 bits. Additionally, coeffMin, coeffMax are the minimum value and the maximum value for clipping.

The inverse separable transform processing unit 31123 derives a transform basis transMatrix[ ] [ ] (=transMatrixH[ ] [ ]) expressed in a matrix of nTbS×nTbS derived by using trTypeHor. nTbS is the height nTbH of the TU. The horizontal transform processing unit 152123 transforms the intermediate value g[x] [y] to a prediction residual r[x] [y] using a horizontal one-dimensional transform.

$$r[x][y] = \Sigma(transMatrix[x][j] \times g[j][y]) \quad (j=0 \ldots nTbS-1)$$

The symbol E means processing for adding the product of a matrix transMatrix[x] [j] and g[j] [y] for the index j=0 . . . nTbS −1. That is, r[x] [y] is obtained by arranging rows obtained from the product of g[j] [y] (j=0 . . . nTbS−1) corresponding to each column of g[x] [y] and a matrix element transMatrix.

The addition unit 312 adds a prediction image of a block input from the prediction image generation unit 308 to a prediction error input from the inverse quantization and inverse transform processing unit 311 to generate a decoded image of the block. The addition unit 312 stores the decoded image of the block in the reference picture memory 306 and outputs the decoded image to the loop filter 305.

Configuration of Video Coding Apparatus

Figure 12:
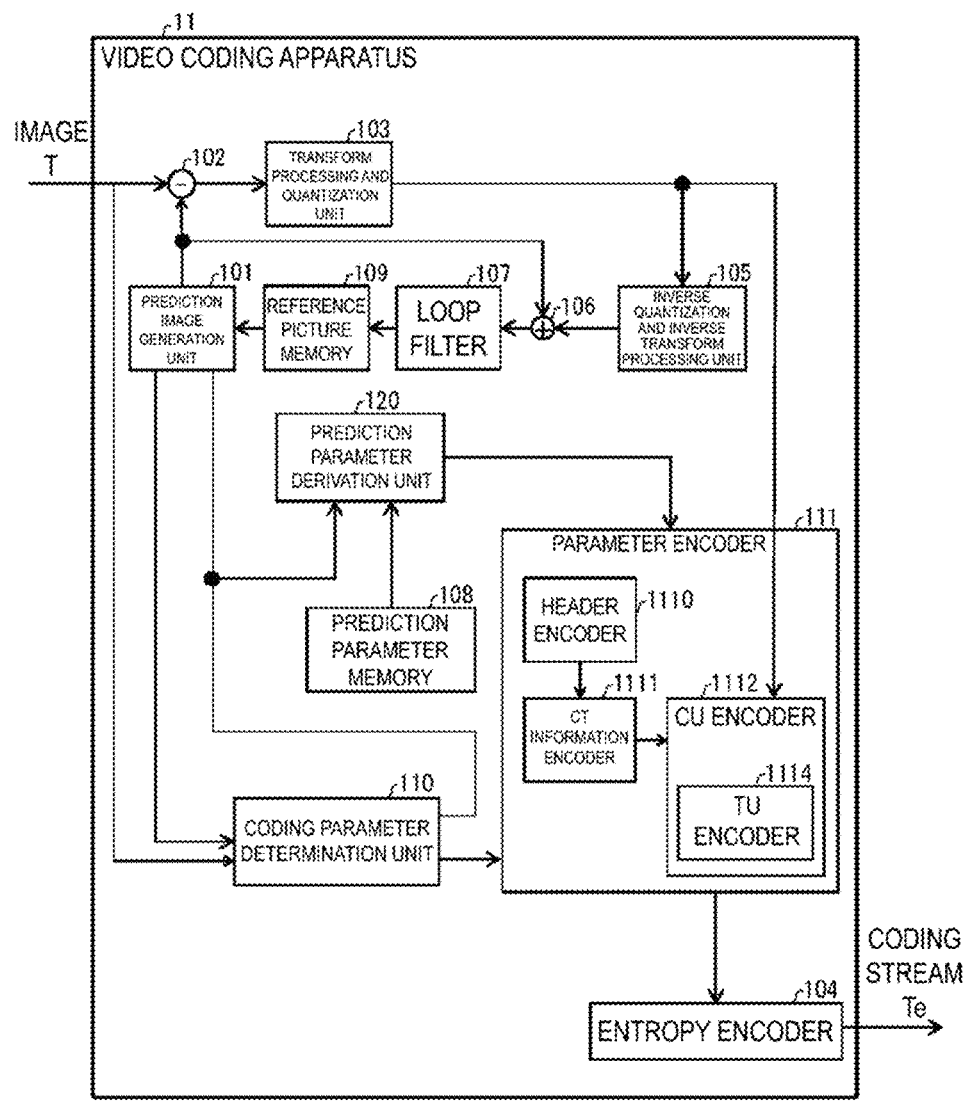
FIG. 12 is a block diagram illustrating a configuration of the video coding apparatus.

Now, a configuration of the video coding apparatus 11 according to the present embodiment will be described. FIG. 12 is a block diagram illustrating a configuration of the video coding apparatus 11 according to the present embodiment. The video coding apparatus 11 includes a prediction image generation unit 101, a subtraction unit 102, a transform processing and quantization unit 103, an inverse quantization and inverse transform processing unit 105, an addition unit 106, a loop filter 107, a prediction parameter memory (a prediction parameter storage unit and a frame memory) 108, a reference picture memory (a reference image storage unit and a frame memory) 109, a coding parameter determination unit 110, a parameter encoder 111, and an entropy encoder 104.

The prediction image generation unit 101 generates a prediction image P for each of the CUs corresponding to the regions into which each of the pictures of the image T is split. The prediction image generation unit 101 performs the same operations as those of the prediction image generation unit 308 already described, and will not be described below.

The subtraction unit 102 subtracts, from pixel values for the image T, pixel values for a prediction image of a block input from the prediction image generation unit 101, to generate a prediction error.

The subtraction unit 102 outputs the prediction error to the transform processing and quantization unit 103.

The transform processing and quantization unit 103 performs a frequency transform on the prediction error input from the subtraction unit 102 to calculate a transform coefficient, and performs quantization on the prediction error to derive a quantization transform coefficient. The transform processing and quantization unit 103 outputs the quantization transform coefficient to the entropy encoder 104 and the inverse quantization and inverse transform processing unit 105.

The conversion and quantization unit 103 includes a separable transform processing unit (a first transform processing unit, not illustrated), a second scaling unit (not illustrated), and a non-separable transform processing unit (a second transform processing unit, not illustrated).

The separable transform processing unit applies a separable transform to the prediction error. The second scaling unit performs scaling based on the scaling list, on the transform coefficient (separable transform coefficient) resulting from a transform performed by the separable transform processing unit. The non-separable transform processing unit applies a non-separable transform to the separable transform coefficient resulting from the scaling. Thus, the weights in the scaling list correspond to the respective separable transform coefficient values, allowing for appropriate scaling. As a result, the non-separable transform can be preferably applied.

The non-separable (forward) transform applied in the video coding apparatus 11 is processing substantially equal to the processing S1 to S4 of the inverse non-separable transform applied to the video decoding apparatus 31 except that the non-separable transform is inversely applied in the order of processing S1, S4, S3, and S2.

In the processing S1, the non-separable transform processing unit performs processing similar to the processing by the inverse non-separable transform processing unit 31121 except that the input and output of the non-separable transform processing unit are the lengths nStOutSize and nonZeroSize, respectively.

In the processing S4, the non-separable transform processing unit derives a one-dimensional array of coefficients v[ ] of nStOutSize (or nStSize*nStSize) from transform coefficients d[ ] [ ] at prescribed positions in the TU.

In the processing S3, the non-separable transform processing unit obtains one-dimensional coefficients u[ ] of nonZeroSize (vector F) from a one-dimensional array of coefficients v[ ] of nStOutSize (vector V) and a transform basis T[ ] [ ] by using the following transform.

u[i]=Clip3 (CoeffMin, CoeffMax, Σ(secTransMatrix[j] [i] v[j]+64)>>7)

Here, the non-separable transform uses a matrix obtained by transposing a matrix secTransMatrix[ ] [ ] used in the inverse non-separable transform. In the above description, by respectively replacing the indexes [i] and [j] with [j] and [i], transposition is processed even using the same matrix.

In processing S2, the non-separable transform processing unit sorts the one-dimensional coefficients u[ ] of nonZeroSize into a two-dimensional array to derive the transform coefficient d[ ] [ ].

xC=(xSbIdx<<log2StSize)+DiagScanOrder[log2StSize] [log2StSize] [x] [0]
yC=(ySbIdx<<log2StSize)+DiagScanOrder[log2StSize] [log2StSize] [x] [1]d[xC] [yC]=u[x]

The inverse quantization and inverse transform processing unit 105 is the same as the inverse quantization and inverse transform processing unit 311 (FIG. 10) in the video decoding apparatus 31, and descriptions thereof are omitted. The calculated prediction error is output to the addition unit 106.

To the entropy encoder 104, the quantization transform coefficient is input from the transform processing and quantization unit 103, and the coding parameter is input from the parameter encoder 111. The coding parameter is, for example, predMode indicating a prediction mode. predMode may be either a MODE_INTRA indicating an intra prediction, MODE_INTER indicating an inter prediction, or MODE_IBC indicating an intra block copy prediction in which the blocks in the MODE_INTRA or MODE_INTER picture are copied to provide a prediction image.

The entropy encoder 104 entropy-codes the split information, the prediction parameters, the quantization transform coefficients, and the like to generate and output a coding stream Te.

The parameter encoder 111 includes a header encoder 1110 (not illustrated), a CT information encoder 1111, a CU encoder 1112 (prediction mode encoder), and an inter prediction parameter encoder 112 and an intra prediction parameter encoder 113. The CU encoder 1112 further includes a TU encoder 1114.

General operation of each module will now be described. The parameter encoder 111 performs coding processing on parameters such as header information, split information, prediction information, quantization transform coefficients, and the like.

The CT information encoder 1111 codes QT, MT (BT and TT) split information, and the like from the coded data.

The CU encoder 1112 codes the CU information, prediction information, TU split flag, CU residual flag, and the like.

In a case that the TU includes a prediction error, the TU encoder 1114 codes QP update information (quantization correction value) and the quantization prediction error (residual coding).

The CT information encoder 1111 and the CU encoder 1112 feed syntax elements such as inter prediction parameters, intra prediction parameters (intra_luma_mpm_flag, intra_luma_mpm_idx, intra_luma_mpm_remainder), and quantization transform coefficients, to the entropy encoder 104.

Configuration of Intra Prediction Parameter Encoder 113

The intra prediction parameter encoder 113 derives a format for coding (for example, intra_luma_mpm_idx, intra_luma_mpm_remainder, or the like) from the intra prediction mode IntraPredMode input from the coding parameter determination unit 110. The intra prediction parameter encoder 113 includes a configuration partially identical to a configuration in which the intra prediction parameter decoder 304 derives intra prediction parameters.

Figure 13:
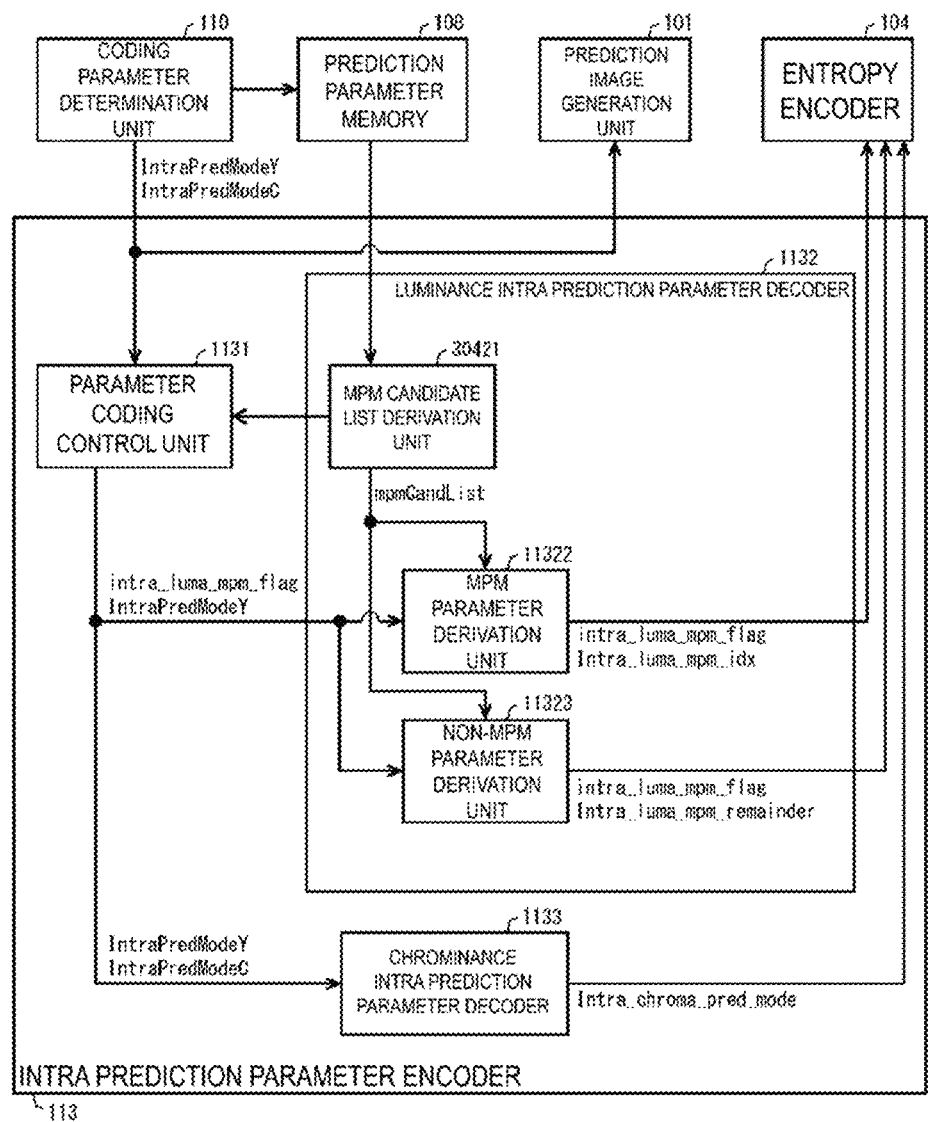
FIG. 13 is a schematic diagram illustrating a configuration of an intra prediction parameter encoder.

FIG. 13 is a schematic diagram illustrating a configuration of the intra prediction parameter encoder 113 of the parameter encoder 111. The intra prediction parameter encoder 113 includes a parameter coding control unit 1131, a luminance intra prediction parameter derivation unit 1132, and a chrominance intra prediction parameter derivation unit 1133.

The parameter coding control unit 1131 receives IntraPredModeY and IntraPredModeC from the coding parameter determination unit 110. The parameter coding control unit 1131 references mpmCandList[ ] of an MPM candidate list derivation unit 30421 to determine intra_luma_mpm_flag. Then, intra_luma_mpm_flag and IntraPredModeY are output to the luminance intra prediction parameter derivation unit 1132. IntraPredModeC is output to the chrominance intra prediction parameter derivation unit 1133.

The luminance intra prediction parameter derivation unit 1132 includes an MPM candidate list derivation unit 30421 (a candidate list derivation unit), the MPM parameter derivation unit 11322, and the non-MPM parameter derivation unit 11323 (a coder, a derivation unit).

The MPM candidate list derivation unit 30421 references the intra prediction modes of the neighbor blocks stored in the prediction parameter memory 108 to derive mpmCandList[ ]. The MPM parameter derivation unit 11322 derives intra_luma_mpm_idx from the IntraPredModeY and mpmCandList[ ] to the entropy encoder 104 in the case of the intra_luma_mpm_flag of 1. In a case that the intra_luma_mpm_flag is 0, the non-MPM parameter derivation unit 11323 derives RemIntraPredMode from IntraPredModeY and mpmCandList[ ] and outputs intra_luma_mpm_remainder to the entropy encoder 104.

The chrominance intra prediction parameter derivation unit 1133 derives and outputs intra_chroma_pred_mode from IntraPredModeY and IntraPredModeC.

The addition unit 106 adds, for each pixel, a pixel value for the prediction image of the block input from the prediction image generation unit 101 and the prediction error input from the inverse quantization and inverse transform processing unit 105 to generate a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may include only a deblocking filter, for example.

The SAO is a filter that adds, in a sample unit, offsets corresponding to classification results, and the ALF is a filter that uses the product sum of a transmitted filter coefficient and the reference image (or a difference between the reference image and the target pixel).

The prediction parameter memory 108 stores the prediction parameters generated by the coding parameter determination unit 110, at predetermined positions for each target picture and each target CU.

The reference picture memory 109 stores the decoded image generated by the loop filter 107, at a predetermined position for each target picture and each target CU.

The coding parameter determination unit 110 selects one set among multiple sets of coding parameters. The coding parameter refers to the above-described QT, BT, or TT split information, the prediction parameter or a parameter to be coded, the parameter being generated in association with the split information or prediction parameter. The prediction image generation unit 101 uses the coding parameters to generate a prediction image.

The coding parameter determination unit 110 calculates, for each of the multiple sets, an RD cost value indicating the magnitude of an amount of information and a coding error. The coding parameter determination unit 110 selects a set of coding parameters that minimizes the cost value calculated. With this configuration, the entropy encoder 104 outputs the selected set of coding parameters as the coding stream Te. The coding parameter determination unit 110 stores the determined coding parameters in the prediction parameter memory 108.

Note that a computer may be used to realize a part of the video coding apparatus 11 and the video decoding apparatus 31 in the above-described embodiments, for example, the entropy decoder 301, the prediction parameter decoder 302, the loop filter 305, the prediction image generation unit 308, the inverse quantization and inverse transform processing unit 311, the addition unit 312, the prediction image generation unit 101, the subtraction unit 102, the transform processing and quantization unit 103, the entropy encoder 104, the inverse quantization and inverse transform processing unit 105, the loop filter 107, the coding parameter determination unit 110, and the parameter encoder 111. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the above-described program may be configured to realize some of the functions described above, and additionally may be configured to realize the functions described above, in combination with a program already recorded in the computer system.

A part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. A circuit integration technique is not limited to the LSI, and may be realized with a dedicated circuit or a general-purpose processor. Furthermore, in a case that advances in semiconductor technology lead to the advent of a circuit integration technology that replaces an LSI, an integrated circuit based on the circuit integration technology may be used.

The embodiment of the present disclosure has been described in detail above referring to the drawings, but the specific configuration is not limited to the above embodiments and various amendments can be made to a design that fall within the scope that does not depart from the gist of the present disclosure.

Application Examples

The above-described video coding apparatus 11 and the video decoding apparatus 31 can be utilized being installed to various apparatuses performing transmission, reception, recording, and reconstruction of videos. Note that, the video may be a natural video imaged by camera or the like, or may be an artificial video (including CG and GUI) generated by computer or the like.

At first, description will be given with reference to FIG. 2, indicating that the above-described video coding apparatus 11 and the video decoding apparatus 31 can be utilized for transmission and reception of videos.

Figure 2:
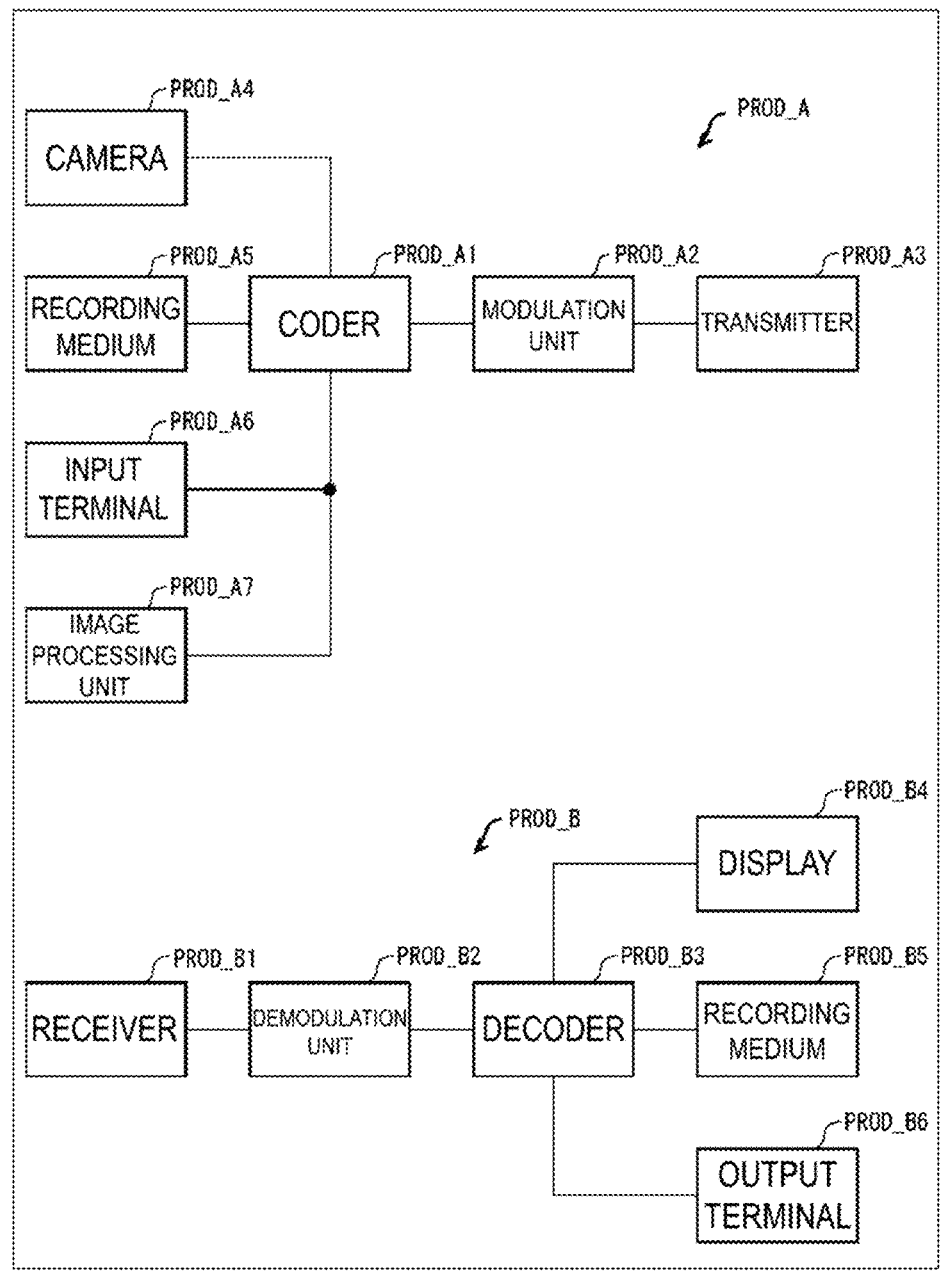
FIG. 2 is a diagram illustrating configurations of a transmitting apparatus equipped with a video coding apparatus and a receiving apparatus equipped with a video decoding apparatus according to the present embodiment. PROD_A indicates the transmitting apparatus equipped with the video coding apparatus, and PROD_B indicates the receiving apparatus equipped with the video decoding apparatus.

FIG. 2 is a block diagram illustrating a configuration of a transmitting apparatus PROD_A installed with the video coding apparatus 11. As illustrated, the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-described video coding apparatus 11 is utilized as the coder PROD_A1.

The transmitting apparatus PROD_A may further include, as feeding sources of videos to be input into the coder PROD_A1, a camera PROD_A4 that images videos, a recording medium PROD_A5 that records videos, an input terminal PROD_A6 for inputting videos from the outside, and an image processing unit A7 which generates or processes images. Although an example configuration in which the transmitting apparatus PROD_A includes all of the constituents is illustrated, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2 also depicts a block diagram illustrating a configuration of a receiving apparatus PROD_B installed with the video decoding apparatus 31. As illustrated, the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-described video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as feeding destinations of the videos to be output by the decoder PROD_B3. Although an example configuration that the receiving apparatus PROD_B includes all of the constituents is illustrated, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. A transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. A broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

A server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. Smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Now, referring to FIG. 3, description will be given indicating that the above-described video coding apparatus 11 and the video decoding apparatus 31 can be utilized for recording and reconstruction of videos.

Figure 3:
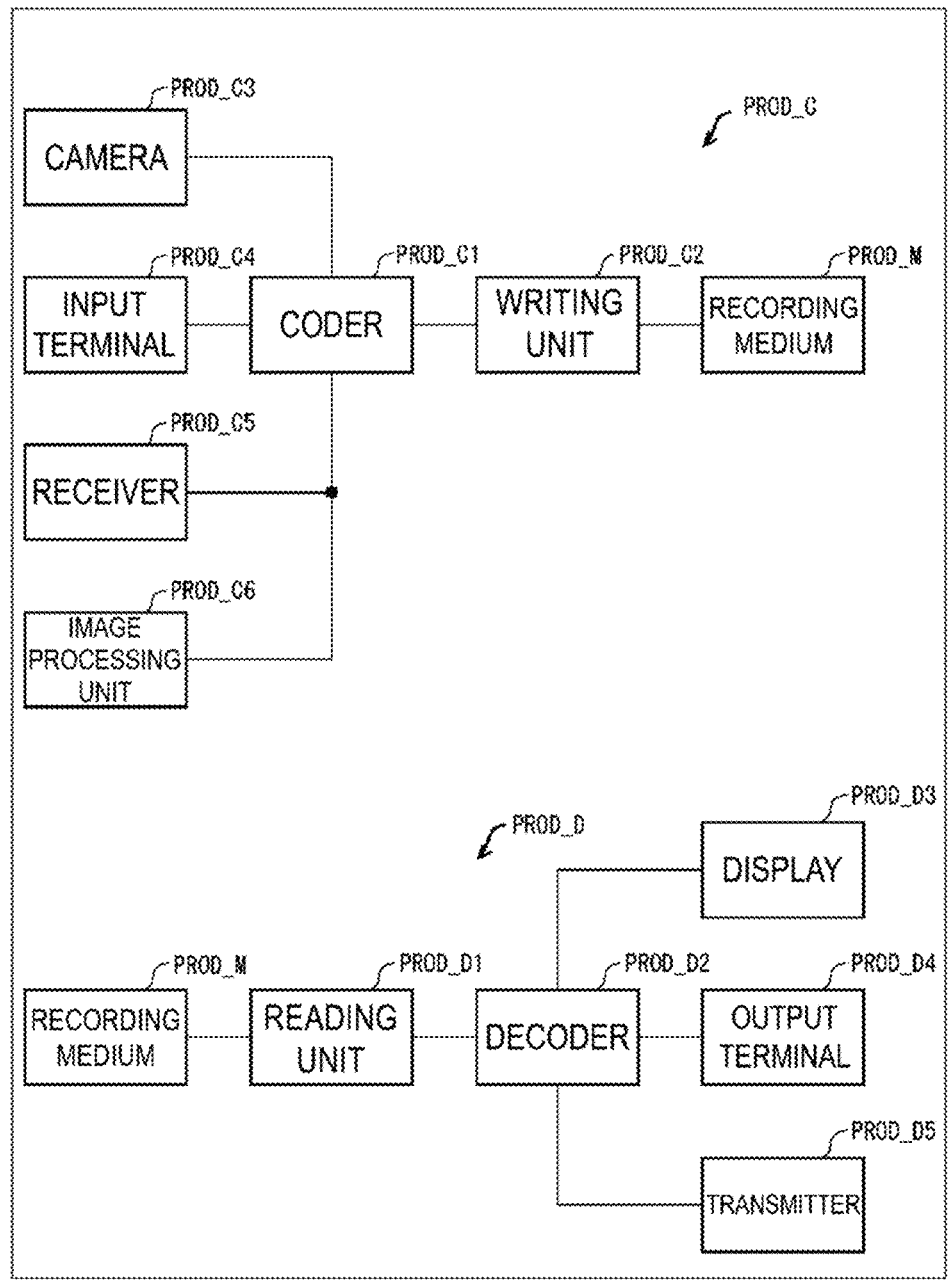
FIG. 3 is a diagram illustrating configurations of a recording apparatus equipped with the video coding apparatus and a reconstruction apparatus equipped with the video decoding apparatus according to the present embodiment. PROD_C indicates the recording apparatus equipped with the video coding apparatus, and PROD_D indicates the reconstruction apparatus equipped with the video decoding apparatus.

FIG. 3 depicts a block diagram illustrating a configuration of a recording apparatus PROD_C installed with the above-described video coding apparatus 11. As illustrated, the recording apparatus PROD_C includes a coder PROD_C1 that obtains coded data by coding a video, and a writing unit PROD_C2 that writes the coded data obtained by the coder PROD_C1 in a recording medium PROD_M. The above-described video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: registered trademark) or Blu-ray Disc (BD: registered trademark).

The recording apparatus PROD_C may further include, as feeding sources of the video input into the coder PROD_C1, a camera PROD_C3 that images a video, an input terminal PROD_C4 for inputting the video from the outside, a receiver PROD_C5 for receiving the video, and an image processing unit PROD_C6 that generates or processes images. Although an example configuration that the recording apparatus PROD_C includes all of the constituents is illustrated, some of the constituents may be omitted.

Note that the receiver PROD_C5 may receive a video image that is not coded or may receive coded data coded in a coding scheme for transmission different from the coding scheme for recording.

In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main feeding source of videos). A camcorder (in this case, the camera PROD_C3 is the main supply source of videos), a personal computer (in this case, the receiver PROD_C5 or the image processing unit C6 is the main feeding source of videos), a smartphone (in this case, the camera PROD_C3 or the receiver PROD_C5 is the main feeding source of videos), or the like is an example of the recording apparatus PROD_C as well.

FIG. 3 is a block diagram illustrating a configuration of a reconstruction apparatus PROD_D installed with the above-described video decoding apparatus 31. As illustrated, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-described video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

The reconstruction apparatus PROD_D may further include a display PROD_D3 that displays a video, an output terminal PROD_D4 for outputting the video to the outside, and a transmitter PROD_D5 that transmits the video, as the feeding destinations of the video to be output by the decoder PROD_D2. Although an example configuration that the reconstruction apparatus PROD_D includes all of the constituents is illustrated, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main feeding destination of videos). A television receiver (in this case, the display PROD_D3 is the main feeding destination of videos), a digital signage (also referred to as an electronic signboard or an electronic bulletin board, and the like, and the display PROD_D3 or the transmitter PROD_D5 is the main feeding destination of videos), a desktop PC (in this case, the output terminal PROD_D4 or the transmitter PROD_D5 is the main feeding destination of videos), a laptop or tablet PC (in this case, the display PROD_D3 or the transmitter PROD_D5 is the main feeding destination of videos), a smartphone (in this case, the display PROD_D3 or the transmitter PROD_D5 is the main feeding destination of videos), or the like is an example of the reconstruction apparatus PROD_D.

Realization by Hardware and Realization by Software

In addition, each block of the above-described video decoding apparatus 31 and video coding apparatus 11 may be realized by hardware using a logical circuit formed on an integrated circuit (IC chip) or may be realized by software by using a Central Processing Unit (CPU).

In the latter case, each of the above-described apparatuses include a CPU that executes a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiments of the present disclosure can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or a MPU), the program codes recorded in the recording medium.

As the recording medium, for example, tapes including a magnetic tape, a cassette tape and the like, discs including a magnetic disc such as a floppy (registered trademark) disk/a hard disk and an optical disc such as a Compact Disc Read-Only Memory (CD-ROM)/Magneto-Optical disc (MO disc)/Mini Disc (MD)/Digital Versatile Disc (DVD: registered trademark)/CD Recordable (CD-R)/Blu-ray Disc (registered trademark), cards such as an IC card (including a memory card)/an optical card, semiconductor memories such as a mask ROM/Erasable Programmable Read-Only Memory (EPROM)/Electrically Erasable and Programmable Read-Only Memory (EEPROM: registered trademark)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. A transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth™, IEEE 802.11 wireless communication, High Data Rate (HDR), Near Field Communication (NFC), Digital Living Network Alliance (DLNA: trademark), a cellular telephone network, a satellite channel, a terrestrial digital broadcast network are available. Note that the embodiments of the present disclosure can be also realized in the form of computer data signals embedded in a carrier such that the transmission of the program codes is embodied in electronic transmission.

The embodiments of the present disclosure are not limited to the above-described embodiments, and various modifications are possible within the scope of the claims. That is, an embodiment obtained by combining technical means modified appropriately within the scope defined by claims is included in the technical scope of the present disclosure as well.

INDUSTRIAL APPLICABILITY

The embodiments of the present disclosure can be preferably applied to a video decoding apparatus that decodes coded data in which image data is coded, and a video coding apparatus that generates coded data in which image data is coded. The embodiments of the present disclosure can be preferably applied to a data structure of coded data generated by the video coding apparatus and referenced by the video decoding apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An image decoding apparatus for scaling a transform coefficient, the image decoding apparatus comprising:
   a scaling list decoder that decodes a flag specifying whether a quantization matrix is applied in a case that a non-separable transform is applied;
   a scaling circuitry that scales the transform coefficient by using one of a first scaling list set to a predetermined value and a second scaling list derived by using the quantization matrix; and a TU decoder that decodes a non-separable transform index specifying whether the non-separable transform is used, wherein:

the scaling circuitry sets a value of a non-separable transform variable to one, in a case that a value of the non-separable transform index is not equal to zero and a colour component indicates luminance component, and the first scaling list is used, in a case that a value of the flag is equal to one and the value of the non-separable transform variable is equal to one.

2. The image decoding apparatus of claim 1, wherein the scaling circuitry sets the predetermined value to the first scaling list, in a case that the value of the non-separable transform index is not equal to zero and a size of a transform block is greater than a predetermined size.

3. An image encoding apparatus for scaling a transform coefficient, the image encoding apparatus comprising:

a scaling list encoder that encodes a flag specifying whether a quantization matrix is applied in a case that a non-separable transform is applied;

a scaling circuitry that scales the transform coefficient by using one of a first scaling list set to a predetermined value and a second scaling list derived by using the quantization matrix; and a TU encoder that encodes a non-separable transform index specifying whether the non-separable transform is used, wherein:

the scaling circuitry sets a value of a non-separable transform variable to one, in a case that a value of the non-separable transform index is not equal to zero and a colour component indicates luminance component, and the first scaling list is used, in a case that a value of the flag is equal to one and the value of the non-separable transform variable is equal to one.

4. An image decoding method for scaling a transform coefficient, the image decoding method comprising:

decoding a flag specifying whether a quantization matrix is applied in a case that a non-separable transform is applied;

scaling the transform coefficient by using one of a first scaling list set to a predetermined value and a second scaling list derived by using the quantization matrix; and decoding a non-separable transform index specifying whether the non-separable transform is used, wherein:

a value of a non-separable transform variable is set to one, in a case that a value of the non-separable transform index is not equal to zero and a colour component indicates luminance component, and the first scaling list is used, in a case that a value of the flag is equal to one and the value of the non-separable transform variable is equal to one.

* * * * *